US012583446B2

(12) United States Patent
Abad et al.

(10) Patent No.: US 12,583,446 B2
(45) **Date of Patent: *Mar. 24, 2026**

(54) SYSTEMS AND METHODS TO DETERMINE A LANE CHANGE STRATEGY AT A MERGE REGION

(71) Applicant: Waymo LLC, Mountain View, CA (US)

(72) Inventors: Pablo Abad, San Francisco, CA (US); Karan Rajen Parikh, Bellevue, WA (US); Ross Anderson, San Francisco, CA (US); Khawaja Waqee Khalid, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/639,029

(22) Filed: Apr. 18, 2024

(65) Prior Publication Data

US 2025/0304040 A1 Oct. 2, 2025

Related U.S. Application Data

(63) Continuation of application No. 17/645,231, filed on Dec. 20, 2021, now Pat. No. 11,987,237.

(51) Int. Cl.
*B60W 30/09* (2012.01)
*B60W 30/18* (2012.01)
(Continued)

(52) U.S. Cl.
CPC ...... *B60W 30/09* (2013.01); *B60W 30/18163* (2013.01); *B60W 60/001* (2020.02);
(Continued)

(58) Field of Classification Search
CPC ........... B60W 30/09; B60W 30/18163; B60W 60/001; B60W 60/0053; B60W 2520/06;
(Continued)

(56) References Cited

U.S. PATENT DOCUMENTS 8,788,134 B1 7/2014 Litkouhi et al.
9,934,688 B2 4/2018 Olson et al.
(Continued)

FOREIGN PATENT DOCUMENTS

CN 112629551 A 4/2021
DE 102019219435 A1 6/2021
WO 2021077446 A1 4/2021

OTHER PUBLICATIONS

Gao et al., "VectorNet: Encoding HD Maps and Agent Dynamics from Vectorized Representation", arXiv:2005.04259v1 [cs.CV] (2020).
(Continued)

*Primary Examiner* — Angelina M Shudy
(74) *Attorney, Agent, or Firm* — McDonnell Boehnen Hulbert & Berghoff LLP

(57) ABSTRACT

A computer-implemented method is provided that involves determining, based on map data, an approaching merge region comprising an on-ramp merging with a road comprising one or more lanes, wherein a truck is traveling on an initial lane of the road according to a navigation plan. The method involves an indication of movement of a vehicle on the on-ramp, wherein the indication of movement is based on data collected by one or more sensors configured to capture sensor data from an environment surrounding the truck. The method involves determining, for the on-ramp and the one or more lanes, respective avoidance scores indicative of a likelihood of an interaction between the truck and the vehicle based on the approaching merge region. The method involves updating the navigation plan based on the
(Continued)

respective avoidance scores. The method also involves controlling the truck to execute a driving strategy based on the updated navigation plan.

20 Claims, 9 Drawing Sheets

(51) Int. Cl.
    *B60W 60/00*        (2020.01)
    *G05B 13/02*        (2006.01)
(52) U.S. Cl.
    CPC ..... *B60W 60/0053* (2020.02); *G05B 13/0265* (2013.01); *B60W 2520/06* (2013.01); *B60W 2520/10* (2013.01); *B60W 2520/105* (2013.01); *B60W 2530/201* (2020.02); *B60W 2552/05* (2020.02); *B60W 2552/10* (2020.02); *B60W 2552/15* (2020.02); *B60W 2552/20* (2020.02); *B60W 2554/20* (2020.02); *B60W 2554/4041* (2020.02); *B60W 2554/4042* (2020.02); *B60W 2555/20* (2020.02)
(58) Field of Classification Search
    CPC ....... B60W 2520/10; B60W 2520/105; B60W 2530/201; B60W 2552/05; B60W 2552/10; B60W 2552/15; B60W 2552/20; B60W 2554/20; B60W 2554/4041; B60W 2554/4042; B60W 2555/20; G05B 13/0265; G05D 1/00; G08G 1/00; G01C 21/00
    See application file for complete search history.

(56) References Cited

U.S. PATENT DOCUMENTS

| | | | | |
|---|---|---|---|---|
| 10,049,581 | B2 | 8/2018 | Yoon | |
| 10,293,819 | B1 | 5/2019 | El-Khatib et al. | |
| 10,424,079 | B2 | 9/2019 | Viswanathan | |
| 10,940,863 | B2 | 3/2021 | Palanisamy et al. | |
| 11,426,871 | B1 | 8/2022 | Anderson et al. | |
| 11,491,987 | B1 | 11/2022 | Ward | |
| 11,505,445 | B2 | 11/2022 | Wu et al. | |
| 11,634,133 | B1 | 4/2023 | Seo et al. | |
| 11,644,835 | B2 | 5/2023 | Wang et al. | |
| 11,780,466 | B1 | 10/2023 | Shah | |
| 11,860,634 | B2 * | 1/2024 | Pan | G06N 3/045 |
| 11,987,237 | B2 * | 5/2024 | Abad | B60W 30/09 |
| 12,291,234 | B2 * | 5/2025 | Kawakita | B60W 50/0097 |
| 2003/0069771 | A1 | 4/2003 | Menninger et al. | |
| 2013/0099911 | A1 | 4/2013 | Mudalige et al. | |
| 2014/0195093 | A1 * | 7/2014 | Litkouhi | B60W 30/18163 701/23 |
| 2015/0100216 | A1 | 4/2015 | Rayes | |
| 2015/0166062 | A1 | 6/2015 | Johnson et al. | |
| 2016/0068156 | A1 | 3/2016 | Horii | |
| 2016/0138925 | A1 | 5/2016 | Takahashi | |
| 2016/0167652 | A1 * | 6/2016 | Slusar | B60W 30/143 701/27 |
| 2017/0076607 | A1 | 3/2017 | Linder et al. | |
| 2017/0241791 | A1 * | 8/2017 | Madigan | G06Q 40/08 |
| 2017/0242435 | A1 * | 8/2017 | Nilsson | G08G 1/167 |
| 2017/0287331 | A1 | 10/2017 | Laur et al. | |
| 2018/0088571 | A1 | 3/2018 | Weinstein-Raun | |
| 2018/0089563 | A1 | 3/2018 | Redding et al. | |
| 2018/0099676 | A1 * | 4/2018 | Goto | B60W 30/10 |
| 2018/0154899 | A1 * | 6/2018 | Tiwari | B60W 50/082 |
| 2018/0194354 | A1 * | 7/2018 | Takeda | B60W 30/10 |
| 2018/0267548 | A1 * | 9/2018 | Sumioka | G08G 1/16 |
| 2019/0049981 | A1 | 2/2019 | Fischer | |
| 2019/0120640 | A1 | 4/2019 | Ho et al. | |
| 2019/0138024 | A1 | 5/2019 | Liang et al. | |
| 2019/0250623 | A1 | 8/2019 | Kentley-Klay et al. | |
| 2019/0272754 | A1 * | 9/2019 | Suzuki | G08G 1/16 |
| 2019/0315344 | A1 | 10/2019 | Guibert De Bruet et al. | |
| 2019/0324475 | A1 * | 10/2019 | Dean | G05D 1/0278 |
| 2019/0329778 | A1 | 10/2019 | D'sa et al. | |
| 2020/0150671 | A1 | 5/2020 | Fan et al. | |
| 2020/0193833 | A1 | 6/2020 | Matsunaga | |
| 2020/0258391 | A1 | 8/2020 | Raichelgauz et al. | |
| 2020/0264900 | A1 | 8/2020 | Cheriton | |
| 2020/0285244 | A1 | 9/2020 | Gier et al. | |
| 2020/0286386 | A1 | 9/2020 | Zhou et al. | |
| 2020/0290619 | A1 | 9/2020 | Mehdi et al. | |
| 2020/0307589 | A1 * | 10/2020 | Li | B60W 60/0023 |
| 2020/0307642 | A1 | 10/2020 | Tsuji et al. | |
| 2021/0053407 | A1 | 2/2021 | Smith et al. | |
| 2021/0055727 | A1 | 2/2021 | Goldman-Shenhar | |
| 2021/0095990 | A1 | 4/2021 | Fowe et al. | |
| 2021/0107486 | A1 | 4/2021 | Oh | |
| 2021/0109536 | A1 * | 4/2021 | Oh | G05D 1/0214 |
| 2021/0110708 | A1 * | 4/2021 | Yang | G08G 1/096844 |
| 2021/0114617 | A1 * | 4/2021 | Phillips | G01C 21/3453 |
| 2021/0122374 | A1 | 4/2021 | Da Silva et al. | |
| 2021/0191394 | A1 | 6/2021 | Dudley et al. | |
| 2021/0201051 | A1 | 7/2021 | Deselaers et al. | |
| 2021/0221377 | A1 | 7/2021 | Fowe et al. | |
| 2021/0291829 | A1 | 9/2021 | Komuro et al. | |
| 2021/0323556 | A1 | 10/2021 | Matsumura et al. | |
| 2021/0364305 | A1 | 11/2021 | Rizk et al. | |
| 2021/0370978 | A1 * | 12/2021 | Molinari | B60W 60/0011 |
| 2021/0403035 | A1 | 12/2021 | Danna et al. | |
| 2021/0403045 | A1 * | 12/2021 | Lin | G01C 21/3453 |
| 2022/0032960 | A1 * | 2/2022 | Wang | G05D 1/0088 |
| 2022/0043449 | A1 | 2/2022 | Iandola et al. | |
| 2022/0074758 | A1 | 3/2022 | Sameer | |
| 2022/0081004 | A1 * | 3/2022 | Brown | G08G 1/166 |
| 2022/0135039 | A1 * | 5/2022 | Jardine | B60W 30/18163 701/26 |
| 2022/0348227 | A1 | 11/2022 | Foster et al. | |
| 2022/0371620 | A1 * | 11/2022 | Kawakita | B60W 60/0011 |
| 2022/0379924 | A1 * | 12/2022 | Foster | B60W 30/18163 |
| 2022/0397402 | A1 | 12/2022 | Bolless et al. | |
| 2022/0402521 | A1 | 12/2022 | Hetang | |
| 2023/0030172 | A1 | 2/2023 | Li et al. | |
| 2023/0097121 | A1 * | 3/2023 | Schwartz | B60W 30/0953 701/26 |
| 2023/0138981 | A1 * | 5/2023 | Willoughby | B60W 30/143 701/26 |
| 2023/0192074 | A1 * | 6/2023 | Abad | B60W 30/09 701/26 |
| 2023/0192149 | A1 | 6/2023 | Uchiyama | |
| 2023/0211777 | A1 | 7/2023 | Hornstein et al. | |
| 2023/0356748 | A1 * | 11/2023 | Hetang | G05B 13/0265 |
| 2023/0415743 | A1 | 12/2023 | Ward | |
| 2024/0174227 | A1 * | 5/2024 | Nimura | G08G 1/167 |
| 2025/0058780 | A1 * | 2/2025 | Shoemaker | B60W 60/001 |
| 2025/0058781 | A1 * | 2/2025 | Shoemaker | B60W 60/001 |
| 2025/0058803 | A1 * | 2/2025 | Shoemaker | B60W 60/00276 |
| 2025/0108835 | A1 * | 4/2025 | Ainampudi | B60W 30/16 |
| 2025/0326395 | A1 * | 10/2025 | Kim | B60W 50/0098 |
| 2025/0333062 | A1 * | 10/2025 | Sefati | B60W 30/18163 |

OTHER PUBLICATIONS

Jula et al., "Collision Avoidance Analysis for Lane Changing and Merging", US Berkeley Research Reports, https://escholarship.org/us/item/3xh107m3 (1999).
Xing et al., Lane Change Strategy for Autonomouns Vehicle:, Washington University Open Scholarship, Mechanical Engineering and Materials Science Independent Study, https://openscholarship.wustl.edu/mems500 (2018).
Ji et al., "Lane-Merging Strategy for a Self-Driving Car in Dense Traffic Using the Stackelberg Game Approach", Electronics, 10:894 (2021).

(56) References Cited

OTHER PUBLICATIONS

Shi et al., "Driving Decision and Control for Automated Lane
Change Behavior based on Deep Reinforcement Learning", IEEE,
(2019).

\* cited by examiner

Top View

600

Training Phase 602

Feedback 660

Training Data 610

Machine Learning Algorithm(s) 620

Trained Machine Learning Model(s) 632

Input Data 630

Inference(s) and/or Prediction(s)

650

Inference/Prediction Request(s) 640

Inference Phase 604

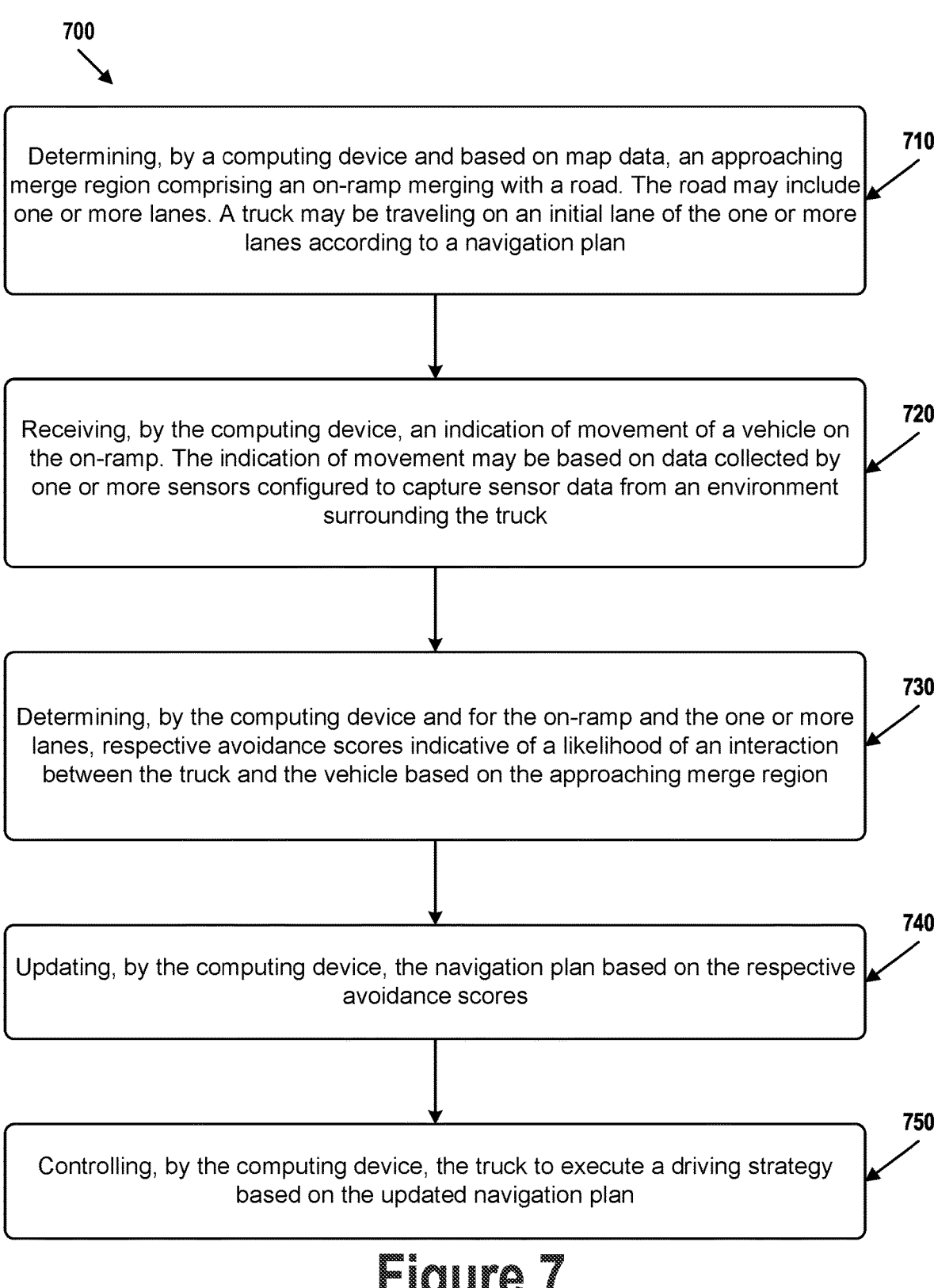

700

710

Determining, by a computing device and based on map data, an approaching merge region comprising an on-ramp merging with a road. The road may include one or more lanes. A truck may be traveling on an initial lane of the one or more lanes according to a navigation plan

720

Receiving, by the computing device, an indication of movement of a vehicle on the on-ramp. The indication of movement may be based on data collected by one or more sensors configured to capture sensor data from an environment surrounding the truck

730

Determining, by the computing device and for the on-ramp and the one or more lanes, respective avoidance scores indicative of a likelihood of an interaction between the truck and the vehicle based on the approaching merge region

740

Updating, by the computing device, the navigation plan based on the respective avoidance scores

750

Controlling, by the computing device, the truck to execute a driving strategy based on the updated navigation plan

Figure 7

SYSTEMS AND METHODS TO DETERMINE A LANE CHANGE STRATEGY AT A MERGE REGION

CROSS-REFERENCE TO RELATED APPLICATIONS

This application is a continuation of U.S. patent application Ser. No. 17/645,231, filed Dec. 20, 2021, which is incorporated herein by reference.

BACKGROUND

A vehicle may be equipped with a variety of sensors to facilitate safe operation of the vehicle in a surrounding environment. Example sensors may include position sensors (e.g., Global Positioning System, etc.), inertial sensors (e.g., gyroscopes, accelerometers, etc.), scanning sensors (e.g., LIDARs, RADARs, Cameras, etc.), among other types of sensors. An autonomous vehicle can be configured to execute an autonomous driving strategy by selecting a path from one or more available paths. Real-time adjustments can be made to the operation of the autonomous vehicle based on data from the sensors.

SUMMARY

A truck may include a variety of sensors mounted at different locations on and/or inside the truck. Data from such sensors, along with map data, may be utilized to identify a vehicle on an on-ramp that may soon be merging with a highway on which the truck is traveling. The truck may be controlled to execute a responsive driving strategy to avoid an interaction with the vehicle.

In a first example embodiment, a computer-implemented method is provided that includes determining, by a computing device and based on map data, an approaching merge region comprising an on-ramp merging with a road. The road may include one or more lanes. A truck may be traveling on an initial lane of the one or more lanes according to a navigation plan. The method also includes receiving, by the computing device, an indication of movement of a vehicle on the on-ramp. The indication of movement may be based on data collected by one or more sensors configured to capture sensor data from an environment surrounding the truck. The method further includes determining, by the computing device and for the on-ramp and the one or more lanes, respective avoidance scores indicative of a likelihood of an interaction between the truck and the vehicle based on the approaching merge region. The method additionally includes updating, by the computing device, the navigation plan based on the respective avoidance scores. The method further includes controlling, by the computing device, the truck to execute a driving strategy based on the updated navigation plan.

In a second example embodiment, a truck is provided. The truck includes one or more sensors configured to capture sensor data from an environment surrounding the truck, and a controller configured to perform operations. The operations include determining, by a computing device and based on map data, an approaching merge region comprising an on-ramp merging with a road. The road may include one or more lanes. The truck may be traveling on an initial lane of the one or more lanes according to a navigation plan. The operations also include receiving, by the computing device, an indication of movement of a vehicle on the on-ramp. The indication of movement may be based on data collected by one or more sensors configured to capture sensor data from an environment surrounding the truck. The operations further include determining, by the computing device and for the on-ramp and the one or more lanes, respective avoidance scores indicative of a likelihood of an interaction between the truck and the vehicle based on the approaching merge region. The operations additionally include updating, by the computing device, the navigation plan based on the respective avoidance scores. The operations also include controlling, by the computing device, the truck to execute a driving strategy based on the updated navigation plan.

In a third example embodiment, a system is provided. The system includes at least one processor, and a memory having stored thereon instructions that, upon execution by the at least one processor, cause the system to perform operations. The operations include determining, by a computing device and based on map data, an approaching merge region comprising an on-ramp merging with a road. The road may include one or more lanes. A truck may be traveling on an initial lane of the one or more lanes according to a navigation plan. The operations also include receiving, by the computing device, an indication of movement of a vehicle on the on-ramp. The indication of movement may be based on data collected by one or more sensors configured to capture sensor data from an environment surrounding the truck. The operations further include determining, by the computing device and for the on-ramp and the one or more lanes, respective avoidance scores indicative of a likelihood of an interaction between the truck and the vehicle based on the approaching merge region. The operations additionally include updating, by the computing device, the navigation plan based on the respective avoidance scores. The operations also include controlling, by the computing device, the truck to execute a driving strategy based on the updated navigation plan.

In a fourth example embodiment, a non-transitory computer readable storage medium is provided having stored thereon instructions that, when executed by a computing device, cause the computing device to perform operations. The operations include determining, by the computing device and based on map data, an approaching merge region comprising an on-ramp merging with a road. The road may include one or more lanes. A truck may be traveling on an initial lane of the one or more lanes according to a navigation plan. The operations also include receiving, by the computing device, an indication of movement of a vehicle on the on-ramp. The indication of movement may be based on data collected by one or more sensors configured to capture sensor data from an environment surrounding the truck. The operations further include determining, by the computing device and for the on-ramp and the one or more lanes, respective avoidance scores indicative of a likelihood of an interaction between the truck and the vehicle based on the approaching merge region. The operations additionally include updating, by the computing device, the navigation plan based on the respective avoidance scores. The operations also include controlling, by the computing device, the truck to execute a driving strategy based on the updated navigation plan.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 illustrates a flow chart, in accordance with example embodiments.

DETAILED DESCRIPTION

Figure 1:
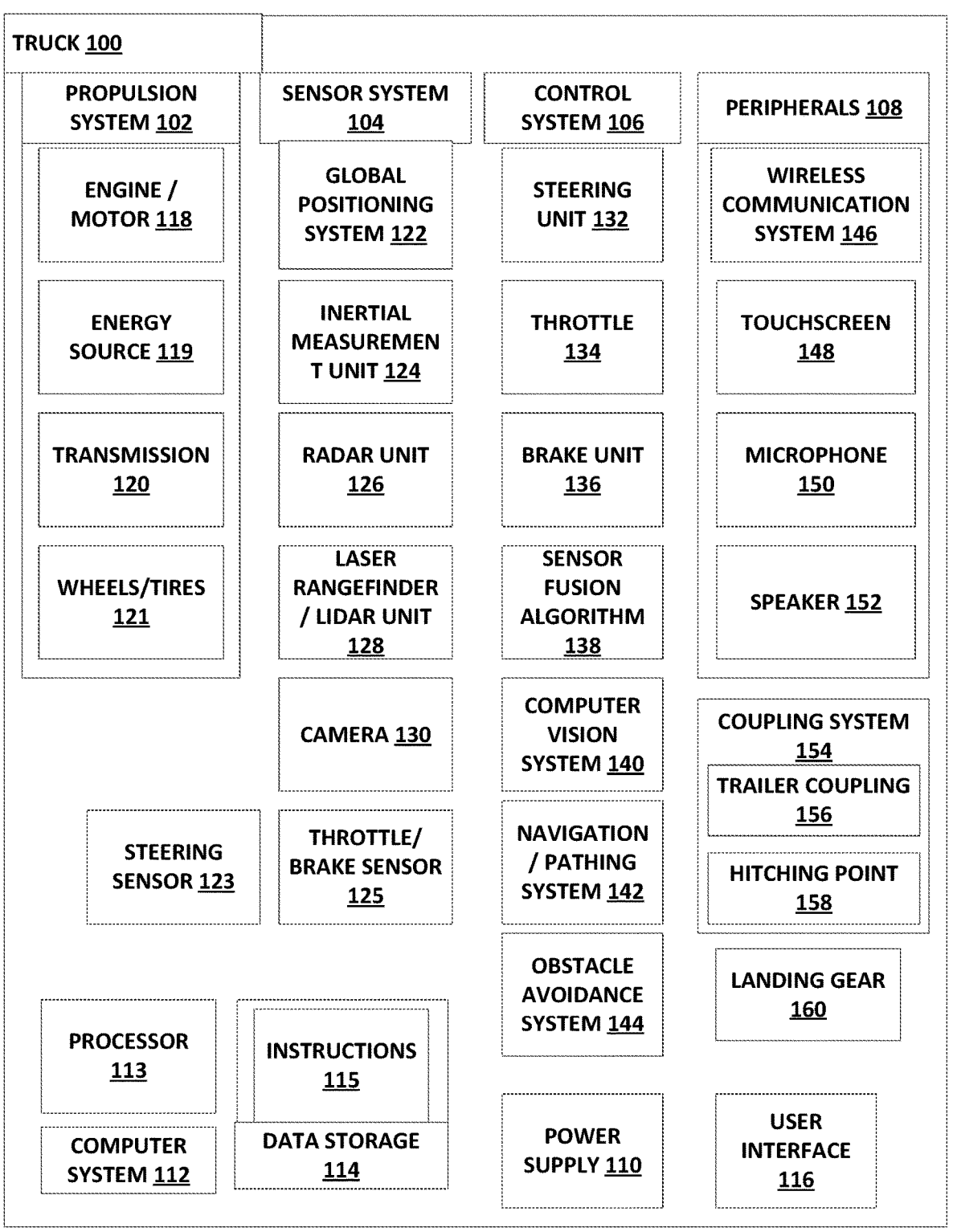
FIG. 1 illustrates a block diagram of a vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.
Overview The technology described herein relates to fully autonomous or semi-autonomous vehicles. Some jurisdictions may have motor vehicle laws and/or guidance relating to utilizing a right lane of a freeway. For example, the guidance and/or law may stipulate that any vehicle proceeding at less than a normal speed of traffic (or a posted speed) at the time and place and under existing conditions should be driven in a right-hand lane that is available for traffic. Many states in the United States have statutory requirements for operation of motor vehicles, with exceptions for overtaking, passing, diversions, and so forth. In some states, such statutes have supplements that include rules and regulations governing an operation of a large motor vehicle, such as a truck. Also, for example, roadways may include posted signs directed at trucks. For example, standard signs on freeways may instruct trucks over 13 tons to use a specific lane (e.g., the right lane, the right two lanes, and so forth) for a specified number of miles. Another example may be posted signs that instruct a truck to give right of way to, and/or change lanes for, merging traffic.

Although a truck may normally travel on a specified lane, a driver of the truck may deviate from this in order to accommodate other vehicles and maintain road safety. For example, a defensive and courteous driving strategy may be employed where the driver of a truck yields the right of way to another vehicle that may be merging onto a highway, by changing lanes, slowing down, speeding up, applying brakes, and so forth. Although a human driver of the truck can make such real-time assessments to execute a defensive driving strategy, it may be more challenging for an autonomous truck to do the same. Examples described herein relate to determining factors when an autonomous vehicle (such as a truck) traveling on a road can safely avoid traffic from an on-ramp merging with the road. Such techniques can provide benefits similar to a defensive driving posture of a human driver.

One way to determine whether to change lanes to avoid the merging vehicle may be to identify an upcoming merge region in a roadgraph, determine if a trajectory of an autonomous truck overlaps and/or intersects with a trajectory of the merging vehicle, and upon a determination that the respective trajectories overlap or intersect, determine that the lane needs to be changed. However, such a solution is not ideal as it depends on a route and pose of the autonomous truck, and can result in flickering decisions. Also, for example, such an approach may generally apply to a possible collision scenario, and may result in otherwise unsafe driving scenarios. For example, although a collision may be averted by not changing lanes, the interaction at the merge region may be uncomfortable for a driver (and/or passengers) in the merging vehicle.

Another strategy may involve always changing lanes to an interior lane prior to a merge region so that there is no interaction with a potential merging vehicle. However, such a strategy is less than ideal because a lane change would occur even when there is no merging vehicle. Also, for example, there may be high traffic density in the interior lane, thereby causing discomfort and/or creating unsafe conditions for vehicles on the interior lane.

Accordingly, an effective strategy may take into account the merge region, vehicles that may be merging, conditions in adjacent lanes, and so forth. As described herein, a computing device of a truck may receive data from one or more sensors of the truck and may query a sensor data processing unit to determine if there is an upcoming merge region where an on-ramp merges with the road that the truck is traveling on. In some aspects, the query may be limited to merge regions that are within a threshold distance from the truck. Also, for example, based on the data from the one or more sensors, the computing device may determine whether there is a moving vehicle on the on-ramp. Upon a determination that there is a moving vehicle on the on-ramp, a penalty score may be determined, where the penalty score is based at least in part on a number of moving vehicles on the on-ramp. The penalty score may be added to a cost function associated with one or more alternate paths available to the truck. The computing device may then execute an autonomous driving strategy by selecting a path of the alternate paths, where the selected path minimizes the cost function.

Various factors can be used to determine the penalty score. For example, a position and speed of the moving vehicle in the on-ramp may indicate a probability of whether a trajectory of the moving vehicle may intersect with a projected path of the truck. As another example, a distance of the merge region from a current position of the truck, along with a speed of the truck, may indicate a probability of whether a trajectory of the moving vehicle may intersect with a projected path of the truck. Also, for example, the cost function may depend on a presence of other vehicles in a vicinity of the truck, a number of alternate available paths, road banking, road grade, weather conditions, road conditions, and so forth. For example, the cost function may be based on a presence or absence of a construction zone, parameters of a construction zone (e.g., geometric and/or geographic parameters, lane closures, partial lane closures, narrower lanes, presence of heavy equipment, construction work schedules, presence or absence of construction workers, debris, and so forth).

Lane change decision making can be learned using supervised learning using a training dataset comprising real-world and/or simulated scenarios. Also, for example, a neural network can be trained based on a loss function that measures travel time, a disengage probability (likelihood that the driving mode will switch to manual), and so forth. In some aspects inverse reinforcement models may be trained to compute a set of feature weights so that a decision to choose whether to perform a lane change or merge approximately mimics an internal "policy" of a human driver of a truck. A comparative analysis of autonomous lane change decisions by a truck and decisions made by a human driver of another truck driving in similar situations may be performed to improve the autonomous driving strategy.

Example Vehicle Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. In some example embodiments, the vehicle may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles.

By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

Referring now to the figures, FIG. 1 is a functional block diagram illustrating example truck 100, which may be configured to operate fully or partially in an autonomous mode. In some examples, truck 100 may operate in an autonomous mode by receiving and/or generating control instructions from a computing system. As part of operating in the autonomous mode, truck 100 may use sensors to detect and possibly identify objects of the surrounding environment to enable safe navigation. In some embodiments, truck 100 may also include subsystems that enable a driver to control operations of truck 100.

As shown in FIG. 1, truck 100 may include various subsystems, such as propulsion system 102, sensor system 104, control system 106, one or more peripherals 108, power supply 110, computer system 112 (could also be referred to as a computing system), data storage 114, and user interface 116. In other examples, truck 100 may include more or fewer subsystems, which can each include multiple elements. The subsystems and components of truck 100 may be interconnected in various ways.

Propulsion system 102 may include one or more components operable to provide powered motion for truck 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of truck 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of truck 100. As such, transmission 120 may include a gearbox, a clutch, a differential, and a drive shaft, among other possible components. A drive shaft may include axles that connect to one or more wheels/tires 121.

Wheels/tires 121 of truck 100 may have various configurations within example embodiments. For instance, truck 100 may exist in a unicycle, bicycle/motorcycle, tricycle, or car/truck four-wheel format, among other possible configurations. As such, wheels/tires 121 may connect to truck 100 in various ways and can exist in different materials, such as metal and rubber. Some or all of the wheels/tires 121 may be coupled to the transmission 120, and the computer system 112 may be able to receive information about tire pressure, balance and other factors that may impact driving in an autonomous mode.

Sensor system 104 can include various types of sensors, such as Global Positioning System (GPS) 122, inertial measurement unit (IMU) 124, radar 126, laser rangefinder/ LIDAR 128, camera 130, steering sensor 123, and throttle/ brake sensor 125, among other possible sensors. In some embodiments, sensor system 104 may also include sensors configured to monitor internal systems of the truck 100 (e.g., O2 monitor, fuel gauge, engine oil temperature, brake wear).

GPS 122 may include a transceiver operable to provide information regarding the position of truck 100 with respect to the Earth.

IMU 124 may have a configuration that uses one or more accelerometers and/or gyroscopes and may sense position and orientation changes of truck 100 based on inertial acceleration. For example, IMU 124 may detect a pitch, roll, and/or yaw of the truck 100 while truck 100 is stationary or in motion. In some embodiments, IMU 124 may include a register that records data from IMU 124 (e.g., an accelerometer), such as the position and orientation changes of truck 100 based on inertial acceleration. One or more accelerometers may sense changes in vehicular acceleration, and record each change in a register. The register may make sensor data available to control system 106 and/or computer system 112. Sensor data may then be processed, for example, by utilizing a sensor fusion algorithm 138.

In some embodiments, IMU 124 may be sensitive to environmental conditions such as temperature, altitude, barometric pressure, and so forth.

Radar 126 may represent one or more systems configured to use radio signals to sense objects, including the speed and heading of the objects, within the local environment of truck 100. As such, radar 126 may include antennas configured to transmit and receive radio signals. In some embodiments, radar 126 may correspond to a mountable radar system configured to obtain measurements of the surrounding environment of truck 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). In some examples, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of truck 100.

Steering sensor 123 may sense a steering angle of truck 100, which may involve measuring an angle of the steering wheel or measuring an electrical signal representative of the angle of the steering wheel. In some embodiments, steering sensor 123 may measure an angle of the wheels of the truck 100, such as detecting an angle of the wheels with respect to a forward axis of the truck 100. Steering sensor 123 may also be configured to measure a combination (or a subset) of the angle of the steering wheel, electrical signal representing the angle of the steering wheel, and the angle of the wheels of truck 100.

Throttle/brake sensor 125 may detect the position of either the throttle position or brake position of truck 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of truck 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of truck 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of truck 100. In other embodiments, throttle/brake sensor 125 may be configured to measure a pressure applied to a pedal of the vehicle, such as a throttle or brake pedal.

Control system 106 may include components configured to assist in navigating truck 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of truck 100, and throttle 134 may control the operating speed of engine/motor 118 to control the acceleration of truck 100. For example, if the truck 100 is configured for use on a road, such as a tractor-trailer truck or a construction vehicle, the steering unit 132 may include components to control the angle of wheels of the tractor unit to turn the truck 100. Brake unit 136 may decelerate truck 100, which may involve using friction to decelerate wheels/tires 121. In some embodiments, brake unit 136 may convert kinetic energy of wheels/tires 121 to electric current for subsequent use by a system or systems of truck 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for truck 100, which may involve dynamically adjusting navigation during operation. As such, navigation/pathing system 142 may use data from sensor fusion algorithm 138, GPS 122, and maps, among other sources to navigate truck 100. In some aspects, navigation/pathing system 142 may store map information (e.g., highly detailed maps that can be used for navigation). For example, the maps may identify the shape and elevation of roadways, lane markers, intersections, speed limits, cross-walks, merging lanes, road banks, grades, traffic signal devices, buildings, signs, vegetation, real-time traffic information, and so forth. Obstacle avoidance system 144 may evaluate potential obstacles based on sensor data and cause systems of truck 100 to avoid or otherwise negotiate the potential obstacles.

As shown in FIG. 1, truck 100 may also include a coupling system 154 for connectivity between the vehicle and the trailer (e.g., a tractor unit and an associated trailer). The coupling system 154 may include a trailer coupling 156 at the tractor unit and a hitching point 158 at the trailer. The coupling system 154 may provide pneumatic, power, communication, and/or other connections between the tractor unit and the trailer of the truck 100.

When a trailer is connected to a tractor unit, it may be beneficial for the tractor unit to know the current orientation and position of the trailer. In some embodiments, such information may be received using sensors including lidar, radar, cameras, sonar, etc., mounted on the tractor unit. In some embodiments, the information may be received directly from the trailer coupling 156, and/or hitching point 158. For example, a magnetic encoder system may be employed on the trailer coupling 156, and/or hitching point 158 to provide information regarding the relative alignment between the tractor unit and the trailer.

In some embodiments, the trailer coupling 156 may include one or more read heads configured to obtain rotational information from a magnetic encoder ring of the hitching point 158 and to provide the obtained rotational information to the control system 106 in order to determine a relative alignment of the trailer to the tractor unit.

The hitching point 158 may include one or more air conduits and an electrical conduit disposed therein. The first end of the hitching point 158 may include one or more connectors respectively coupled to the one or more air conduits and an electrical connector coupled to the electrical conduit. The second end of the hitching point 158 may include one or more openings corresponding to the air conduits, the one or more openings being arranged to receive air pressure from the tractor unit and supply the air pressure to the brake unit 136 via the air conduits. The second end of the hitching point 158 may include an electrical contact interface configured for operative communication with an electrical connection section of the trailer coupling 156 to provide signals to the control system 106 via the electrical conduit for operation in the autonomous driving mode.

In some embodiments, where truck 100 is a tractor-trailer truck, truck 100 may include a set of landing gear 160. The landing gear 160 may provide a support structure for the trailer when decoupled from the tractor unit. The coupling system 154 provides connectivity between the trailer and the tractor unit. In some embodiments, the coupling system 154 may include a connection section to provide backward compatibility with legacy trailer units that may or may not be capable of operating in an autonomous mode.

In some embodiments, sensor fusion algorithm 138 of truck 100 may include a trailer tracking algorithm that utilizes sensor system 104, and may be implemented by processor 113 of computer system 112. In some aspects, lidar sensor data may be received from one or more lidar sensors mounted on a roof of truck 100, and/or other locations along a tractor-trailer arrangement.

As shown in FIG. 1, truck 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of truck 100. User interface 116 may also accept input from the user via touchscreen 148. Peripherals 108 may also enable truck 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIGBEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

truck 100 may include power supply 110 for powering components. Power supply 110 may include a rechargeable lithium-ion or lead-acid battery in some embodiments. For instance, power supply 110 may include one or more batteries configured to provide electrical power truck 100 may also use other types of power supplies. In an example embodiment, power supply 110 and energy source 119 may be integrated into a single energy source.

truck 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of truck 100 in a distributed fashion.

In some embodiments, data storage 114 may contain instructions 115 (e.g., program logic) executable by processor 113 to execute various functions of truck 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by truck 100 and computer system 112 during the operation of truck 100 in the autonomous, semi-autonomous, and/or manual modes.

truck 100 may include user interface 116 for providing information to or receiving input from a user of truck 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of truck 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of truck 100 and its subsystems. In some embodiments, computer system 112 may disable some or all functions of the truck 100 based on signals received from sensor system 104.

The components of truck 100 could be configured to work in an interconnected fashion with other components within or outside their respective systems. For instance, in an example embodiment, camera 130 could capture a plurality of images that could represent information about a state of an environment of truck 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, truck 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Also, for example, computer system 112 may utilize input from sensor system 104 (e.g., one or more accelerometers in IMU 124) in order to estimate mass properties for a payload to build a confidence level that can be used to determine navigation strategy by truck 100 pulling the payload. For example, computer system 112 may make a determination about various objects based on a change in acceleration in conjunction with timing data obtained from the lasers or other optical sensors configured to sense objects in a field of view of truck 100. The various objects may be in a field of view of truck 100, and/or objects comprising the payload.

Although FIG. 1 shows various components of truck 100 (i.e., wireless communication system 146, computer system 112, data storage 114, and user interface 116) as being integrated into the truck 100, one or more of these components could be mounted or associated separately from truck 100. For example, data storage 114 could, in part or in full, exist separate from truck 100. Thus, truck 100 could be provided in the form of device elements that may be located separately or together. The device elements that make up truck 100 could be communicatively coupled together in a wired and/or wireless fashion.

Figure 2A:
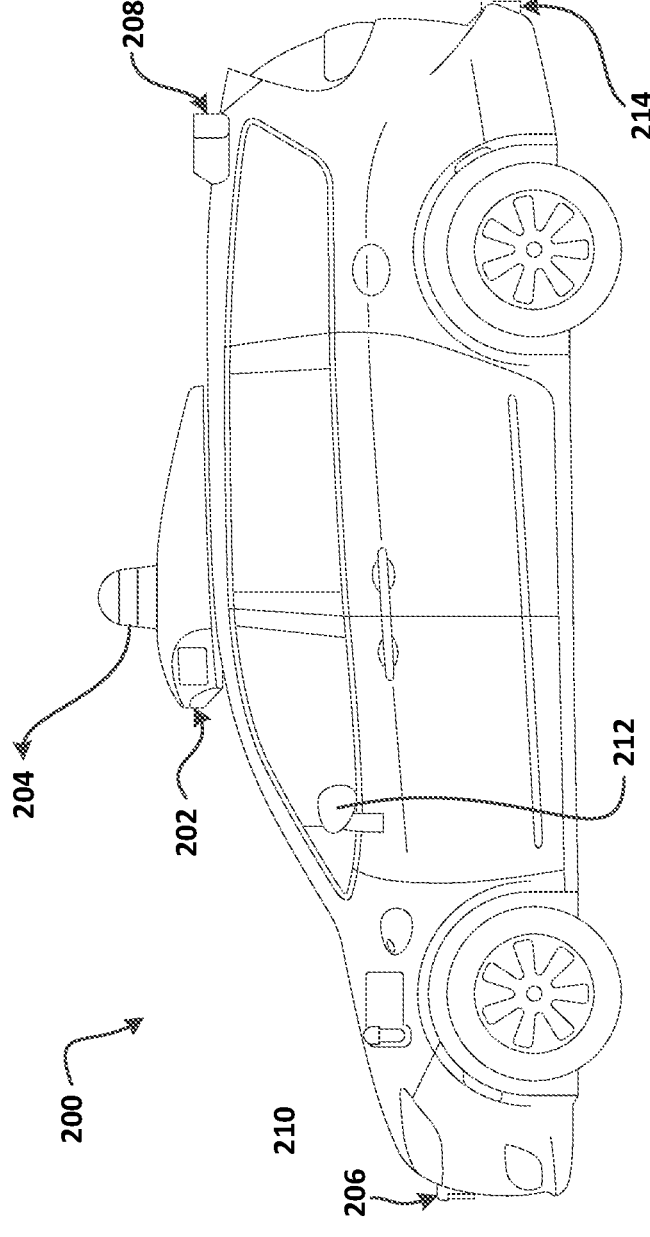
FIG. 2A illustrates a physical configuration of a vehicle, in accordance with example embodiments.

FIG. 2A illustrates a physical configuration of a vehicle, in accordance with example embodiments. In some aspects, FIG. 2A shows an example vehicle 200 (e.g., a truck) that can include some or all of the functions described in connection with truck 100 in reference to FIG. 1. Although vehicle 200 is illustrated in FIG. 2A as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a radar unit 208, a LIDAR/radar unit 210, and two additional locations 212, 214 at which an accelerometer, a gyroscope, a radar unit, LIDAR unit, laser rangefinder unit, and/or other type of sensor or sensor(s) could be located on the vehicle 200. The LIDAR/radar unit 210 can take the form of a LIDAR unit, a radar unit, or both.

Furthermore, the example vehicle 200 can include any of the components described in connection with truck 100 of FIG. 1. The radar unit 208, and/or the LIDAR units 204, 206 can actively scan the surrounding environment for the presence of potential obstacles and can be similar to the radar 126 and/or laser rangefinder/LIDAR 128 in the truck 100. As another example, an accelerometer at location 212 can be similar to the accelerometer included in IMU 124 in the truck 100.

Sensor unit 202 may be mounted atop the vehicle 200 and include one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Furthermore, each sensor of sensor unit 202 can be configured to be moved or scanned independently of other sensors of sensor unit 202.

Although not shown in FIG. 2A, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

Figures 2B, 2C:
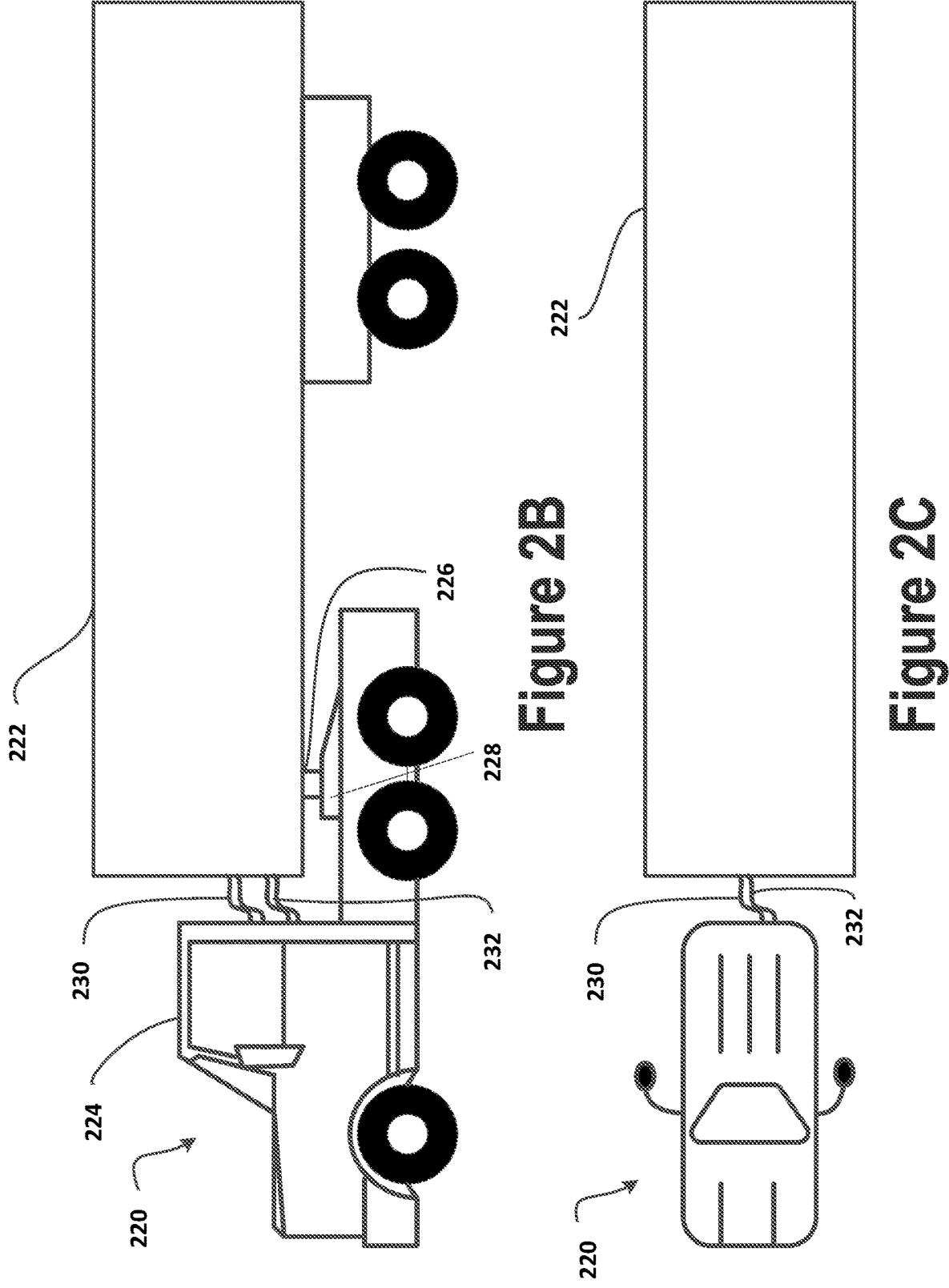
FIG. 2B illustrates an example tractor-trailer configuration, in accordance with example embodiments.
FIG. 2C illustrates an example tractor-trailer configuration, in accordance with example embodiments.

FIGS. 2B and 2C illustrate an example tractor-trailer configuration, in accordance with example embodiments. The tractor-trailer configuration may relate to a tractor-trailer truck. The truck 100 may include, e.g., a single, double or triple trailer, or may be another medium or heavy duty truck such as in commercial weight classes 4 through 8. As shown, the truck 100 includes a tractor unit 220 and a single cargo unit or trailer 222. The trailer 222 may be fully enclosed, open such as a flatbed, or partially open depending on the type of cargo to be transported. The tractor unit 220 includes the engine and steering systems (not shown) and a cab 224 for a driver and any passengers. In a fully autonomous arrangement, the cab 224 may not be equipped with seats or manual driving components, since no person may be necessary.

The trailer 222 includes a hitching point 226. The hitching point 226 is typically formed as a solid steel shaft, which is configured to pivotally attach to the tractor unit 220. In particular, the hitching point 226 attaches to a trailer coupling 228, that is mounted rearward of the cab. For a double or triple tractor trailer, the second and/or third trailers may have simple hitch connections to the leading trailer. Or, alternatively, according to one aspect of the disclosure, each trailer may have its own hitching point. In this case, at least the first and second trailers could include a trailer coupling type structure arranged to couple to the next trailer.

As shown, connectors 230 and 232 also couple from the tractor unit 220 to the trailer 222. These may include one or more air hoses 230 and one or more electrical conduits 232. The air hose(s) 230 enables the tractor unit 220 to operate the pneumatic brakes of the trailer 222, and the electrical conduit(s) 232 provide power and signals to the brakes and lights of the trailer 222. In an autonomous system, it may be difficult or unfeasible to manually connect the air hoses, electrical conduits and other connectors between the tractor unit 220 and trailer 222.

Figure 3:
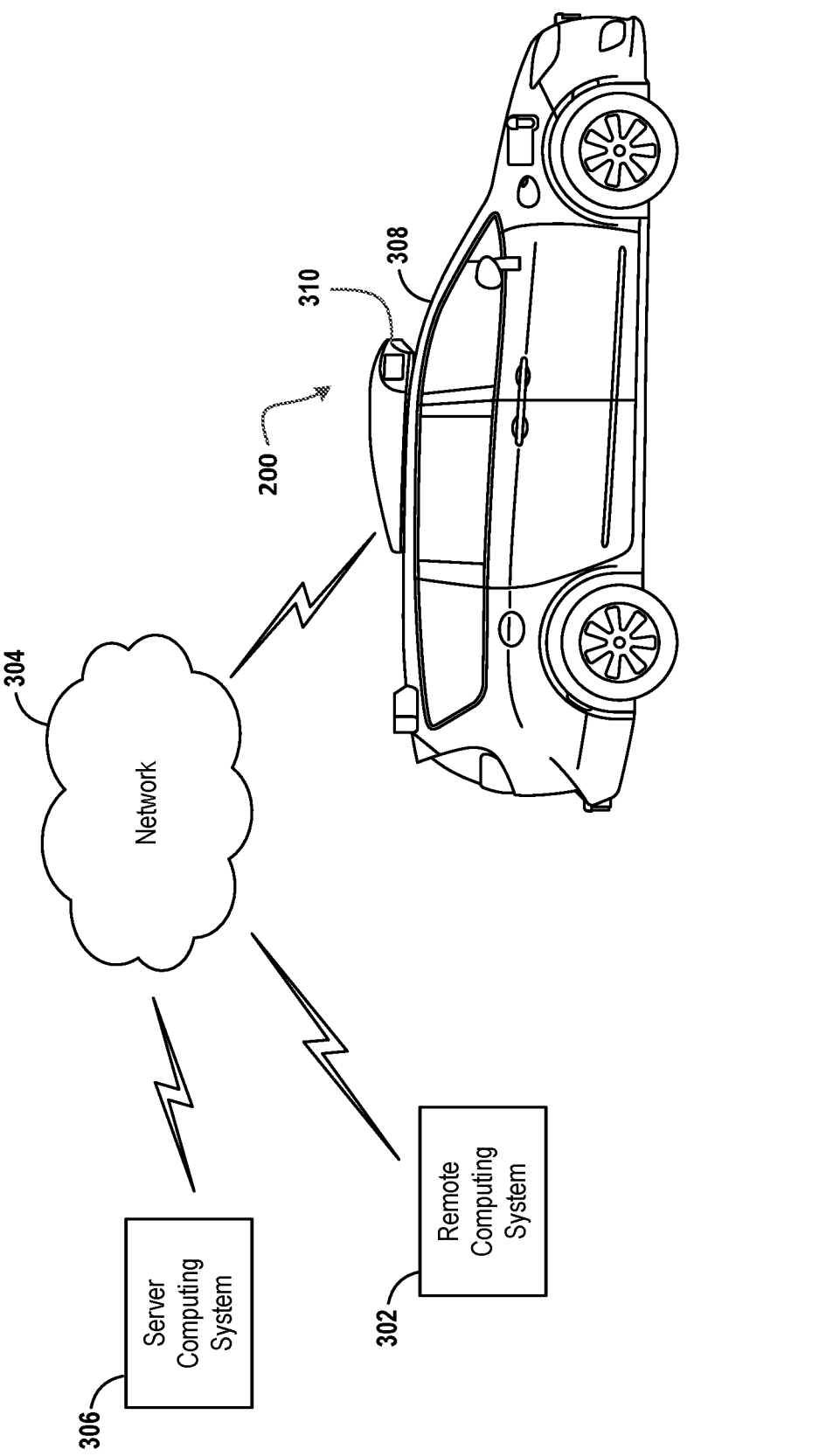
FIG. 3 is a conceptual illustration of wireless communication between various computing systems and a vehicle, in accordance with example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. In some examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of truck 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. In one example, remote computing system 302 may have a remote position from vehicle 200 that has wireless communication via network 304. In another example, remote computing system 302 may correspond to a computing device within vehicle 200 that is separate from vehicle 200, but with which a human operator can interact while a passenger or driver of vehicle 200. In yet another example, remote computing system 302 may be a computing device with a touchscreen operable by the passenger of vehicle 200.

In some embodiments, one or more operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, server computing system 306, or a computing system local to vehicle 200) may operate to use an accelerometer to determine changes in acceleration of an autonomous vehicle. In general, at least one computing system will be able to analyze sensor data from the accelerometer, determine a timestamp associated with the sensor data, and possibly control the autonomous vehicle.

In some embodiments, to facilitate autonomous operation, a vehicle (e.g., vehicle 200) may receive sensor data representing changes in vehicular acceleration in a variety of ways. An accelerometer on the vehicle may provide the sensor data representing changes in acceleration (e.g., updates made to a register of the accelerometer), and the accelerometer may communicate sensor data to a processor in the vehicle.

Lane Change Strategies at a Merge Region

Figure 4:
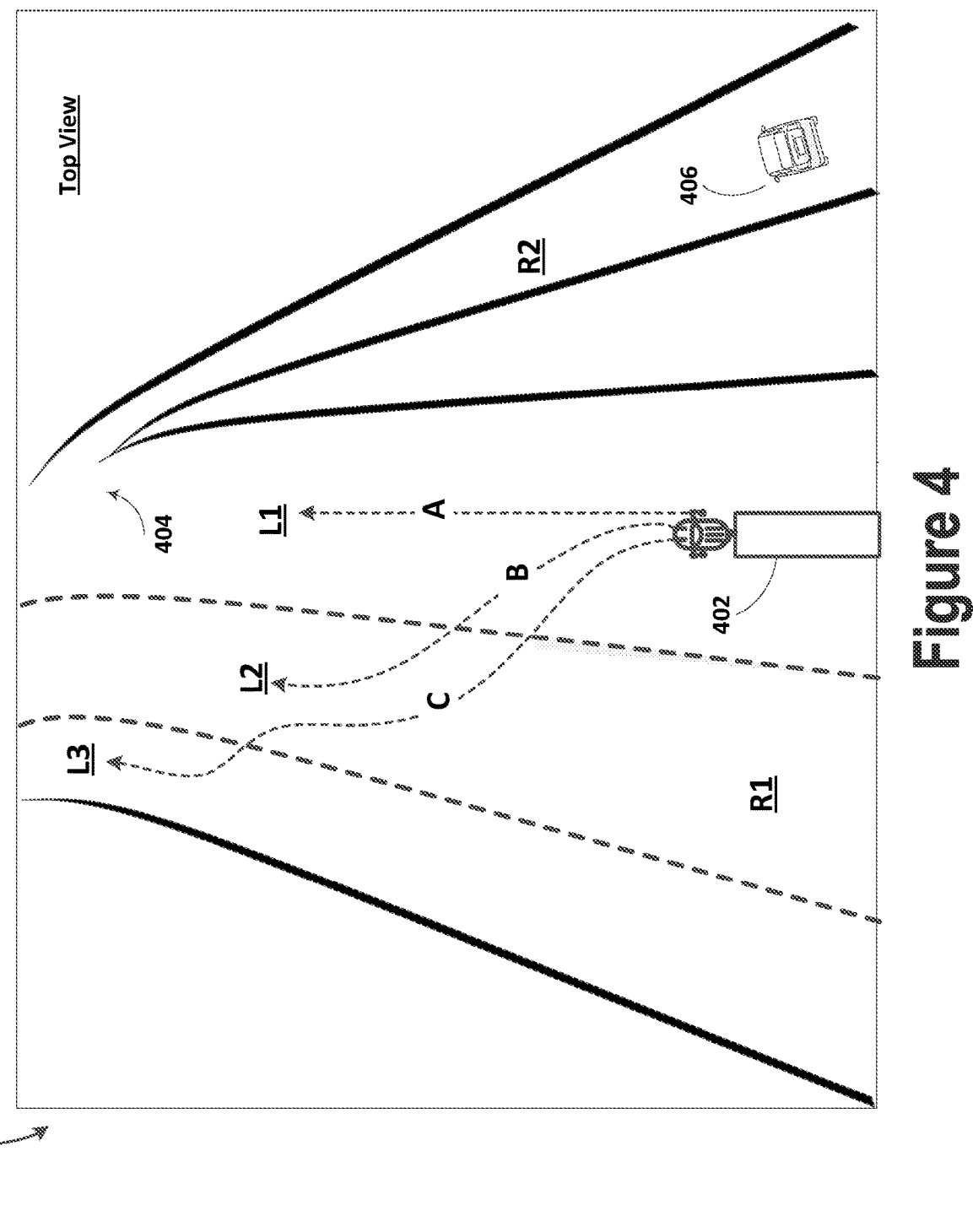
FIG. 4 is a schematic diagram of a merge region, according to an example embodiment.

FIG. 4 is a schematic diagram of a merge region 404, according to an example embodiment. A top view of a roadway 400 is illustrated. An autonomous truck 402 (e.g., truck 100) is shown as traveling on an initial lane L1 of road R1, where road R1 may include one or more lanes. As shown, the autonomous truck 402 may be a truck that may be required to travel on the right hand lane, such as initial lane L1, of a multi-lane highway, such as road R1. A general indication to a merge region 404 is shown as indicated by the arrow, where on-ramp R2 merges with road R1. Generally, the term "merge region" as used herein, may refer to a region where two or more streams of traffic traveling in the same direction on multiple lanes and/or roads merge into one or more shared lanes or roads. For example, in the example embodiment illustrated, the merge region 404 may be along initial lane L1 where traffic merges in from on-ramp R2. However, the term region may be used broadly to include a region within a threshold distance from an actual merging of on-ramp R2 with road R1. For example, merge region 404 may extend to lanes L2, and/or L3.

In some embodiments, merge region 404 may change with an amount of traffic. For example, when a volume of traffic is heavy, merge region 404 may extend over a longer distance, and/or cover multiple lanes. Also, for example, when a volume of traffic is light, merge region 404 may extend over a smaller distance, and/or cover initial lane L1 and on-ramp R2. In some embodiments, merge region 404 may change with a type of merge. For example, merge region 404 may be geographically located near a large metropolitan area. Accordingly, merge region 404 may extend beyond an actual merging of on-ramp R2 with road R1. For example, there may be multiple highways intersecting, bifurcating, with a plurality of entrance and/or exit ramps. In such situations, merge region 404 may be suitably determined. As another example, merge region 404 may depend on a time of day, for example, office rush, school lane closures, and so forth, may affect the size and location of merge region 404. Also, for example, factors such as, but not limited to, weather, road grade, road banking, and/or road construction, may impact the size and location of merge region 404.

In some embodiments, computer system 112 may determine, based on map data, the approaching merge region 404 wherein the on-ramp R2 merges with the road R1, where road R1 includes one or more lanes, and where truck 402 is traveling on an initial lane L1 of the road R1 according to a navigation plan. The term "map data" may refer to known maps that are, for example, saved maps in a map database, or maps that may be inferred online (e.g., during an operation of truck 402) from sensor inputs. In some embodiments, the merge region 404 may be determined by navigation/pathing system 142. For example, navigation/pathing system 142 may store map information that identifies all merge regions, lane markers, intersections, speed limits, merging lanes, real-time traffic information, and so forth. In some embodiments, computer system 112 may query a map database and obtain information related to merge region 404. For example, computer system 112 may query a map database and obtain information related to all future merge regions within a threshold distance from autonomous truck 402. Upon identifying a merge region, computer system 112 may store information related to the path on the freeway and the onramp path that leads to the merge region. For example, computer system 112 may store information related to merge region 404, road R1, and/or initial lane L1, and on-ramp R2.

The term "navigation plan" as used herein, may generally refer to any aspect of a navigation strategy. For example, the navigation plan may be a planned route. The planned route may be based on road conditions, weather data, road grade, road banking, surface friction, and so forth. The navigation plan may be based on vehicle conditions, such as worn tires, older brakes, front wheel or four wheel drive, a number of axles, and so forth. The navigation plan may be based on one or more operational choices for parameters to navigate the planned route. The navigation plan may also involve dynamically adjusting navigation during operation of autonomous truck 402.

In some embodiments, the navigation plan may be based on a cost allocation associated with one or more lanes on the road R1. For example, road R1 may be a three lane highway, and the one or more lanes may be initial lane L1, second lane L2, and third lane L3. The term "cost allocation" generally refers to a cost associated with driving on a particular route. Generally, the higher the cost, the more prohibitive the route. Navigation plans are generally selected based on a route that has a low associated cost allocation. For example, second lane L2 may have an oil slick or black ice, whereas initial lane L1 may be dry. Accordingly, the cost allocation for second lane L2 may be higher than the cost allocation for initial lane L1. As another example, third lane L3 may have more vehicular traffic than second lane L2. Accordingly, the cost allocation for third lane L3 may be higher than the cost allocation for second lane L2. A plurality of factors may contribute to a cost associated with a candidate path, and a cost allocation may be an aggregate of all costs associated with the candidate path.

In some embodiments, computer system 112 may receive an indication of movement of a vehicle 406 on on-ramp R2, or an indication of an object of interest on on-ramp R2. The indication may be based on data collected by one or more sensors configured to capture sensor data from an environment surrounding autonomous truck 402. For example, autonomous truck 402 may have lasers or other optical sensors configured to sense objects in a field of view of autonomous truck 402. Computer system 112 may use the outputs from the various sensors to determine information about objects in a field of view of autonomous truck 402, and may determine distance and/or direction information to the various objects. In particular, computer system 112 may determine an indication of movement of the vehicle 406 on the on-ramp R2.

The term "object of interest" as used herein, generally refers to any object that may result in an interaction with autonomous truck 402 at or near merge region 404. In some aspects, an object may be an object of interest if it is within a threshold distance of autonomous truck 402, and if it is not a stationary object. In some embodiments, an object may not become an object of interest if it is moving at a speed more or less than a respective threshold speed, thereby significantly lowering a likelihood of an interaction.

In some embodiments, road R1 may include one or more lanes, such as initial lane L1, second lane L2, and third lane L3. For example, autonomous truck 402 may be traveling on initial lane L1 and the merge region 404 may involve on-ramp R2 merging into initial lane L1.

Accordingly, autonomous truck 402 may have three options. A first option A may involve autonomous truck 402 continuing to travel on initial lane L1. Such a strategy may be adopted, for example, when autonomous truck 402 is unlikely to interact with any vehicles at merge region 404. For example, although on-ramp R2 may merge with initial lane L1, there may not be any moving vehicles on on-ramp R2. Also, for example, respective speeds of truck 402 and vehicle 406 may indicate that there is no likelihood of an interaction between the two. As another example, based on a distance of merging region 404 from autonomous truck 402, and based on characteristics of autonomous truck 402 (e.g., payload related characteristics, speed, braking and/or acceleration limits, and so forth), computer system 112 may determine that it may be safe to apply brakes, and/or decrease a speed of autonomous truck 402.

A second option B may involve autonomous truck 402 change lanes to an interior lane, such as second lane L2. A third option C may involve autonomous truck 402 change lanes to an interior lane, such as second lane L3. Computer system 112 may evaluate one or more factors to determine a safe option.

In some embodiments, computer system 112 may determine, for the one or more lanes of road R1, and the on-ramp R2, respective avoidance scores indicative of a likelihood of an interaction between the truck 402 and the vehicle 406 based on the approaching merge region 404.

The term "interaction" as used herein, may generally refer to any causal relationship between two objects. For example, an interaction may involve a physical interaction (e.g., a collision). Also, for example, an interaction may involve two objects being within a close proximity of one another. As another example, an interaction may involve an induced change to an operational parameter (e.g., a speed, an acceleration, braking, a change in comfort settings, and so forth) of truck 402, or vehicle 406, or both. In some aspects, the induced change may be due to a potential encounter (e.g., a collision, a sharp turn, a sudden braking, a sudden change in speed, a sudden change in a direction, and so forth).

In some embodiments, the two vehicles may be autonomous vehicles, and an interaction may involve an interference of respective communication systems of the two vehicles, where such an interference may result in loss of control of either or both vehicles, or impede a safe navigation for either or both vehicles. As another example, an interaction between two vehicles may involve a reactive driving strategy by each, that may in turn result in unsafe conditions for one or more objects (e.g., vehicles, construction sites, construction workers, drivers, and so forth) on the road. As another example, an interaction may involve unsafe operational parameters (e.g., sudden swerves, sudden braking, rapid acceleration, and so forth), or driving a vehicle outside its safe operational limits (e.g., outside safe braking and/or acceleration limits based on road and/or weather conditions). Also, for example, an interaction may involve operating a vehicle outside its comfort parameters (e.g., causing the vehicle to be imbalanced, to spin out of control, cause discomfort to passengers, and so forth).

In some embodiments, the respective avoidance scores (or penalty) may be based on a count of a number of vehicles on the on-ramp. For example, a single vehicle may result in an avoidance score of 1, two vehicles may result in an avoidance score of 2, and so forth.

In some embodiments, computer system 112 may update the navigation plan based on the respective avoidance scores. For example, computer system 112 may add the respective avoidance scores to the respective cost allocations for road R1 and on-ramp R2. In some embodiments, the first avoidance score may be added to initial lane L1. Generally, adding an avoidance score to an existing cost allocation for a path increases the cost associated with the path, thereby reducing a likelihood of selection of the path in an updated navigation plan.

In some embodiments, the updating of the navigation plan may involve identifying, in response to the approaching merge region and the indication of movement of the vehicle, one or more candidate lanes on the road, wherein the truck can navigate from the initial lane of the road to the one or more candidate lanes. For example, navigation/pathing system 142 may identify initial lane L1, and third lane L3 on road R1, where autonomous truck 402 may navigate from initial lane L1 to one or more candidate lanes L1, or L3. In some embodiments, navigation/pathing system 142 may select a target lane of the one or more candidate lanes, wherein the target lane corresponds to a low updated cost allocation. For example, navigation/pathing system 142 may update the cost allocations for the one or more candidate lanes L1, L2, and L3, and select a target lane that avoids the penalty (or the avoidance score). Accordingly, due to a higher cost allocation for initial lane L1, navigation/pathing system 142 may recommend a lane change from initial lane L1 to an interior lane L2 or L3, thereby resulting in a lane change away from merge region 404.

In some embodiments, the updating of the navigation plan may involve determining, for each of the one or more lanes, a risk score associated with the merge region, wherein the risk score is indicative of a probability of a change to an autonomous control strategy of the vehicle if the vehicle were to travel on the one or more lanes, and wherein the updating of the cost allocation is based on the risk score. For example, computer system 112 may determine a risk score associated with merge region 404 for the one or more lanes, L1, L2, and L3. Generally, computer system 112 may evaluate scenarios where autonomous truck 402 has navigated to the one or more lanes, and evaluate likelihoods of interaction with the vehicle.

In some aspects, the risk score may be based on one or more factors. For example, the risk score may be based on geometric properties of the vehicle, such as dimensions of the vehicle. For example, vehicle 406 may be a very large vehicle (or a vehicle towing or carrying a payload with a large width), and even if autonomous truck 402 were traveling on second lane L2, there may be a good likelihood that the very large vehicle or payload may merge onto road R1, and a portion of the very large vehicle or payload may intersect second lane L2. Accordingly, computer system 112 may allocate a high risk score to second lane L2.

In some embodiments, the risk score may be based on an actual position of the vehicle within an environment of the truck. For example, the vehicle 406 may be closer to merge region 404, and there may be a high likelihood that as autonomous truck 402 navigates to second lane L2, so does the vehicle 406. Accordingly, a risk score for second lane L2 may be higher than a risk score for initial lane L1 or third lane L3. In some embodiments, the risk score may be based on the speed of the vehicle. For example, speed of the vehicle 406 may indicate a higher likelihood of an interaction in initial lane L1 between autonomous truck 402 and vehicle 406, than in third lane L3. Accordingly, a risk score for initial lane L1 may be higher than a risk score for third lane L3.

In some embodiments, the risk score may be based on an optical flow associated with the vehicle. For example, computer system 112 may determine an optical flow of vehicle 406 by processing frames of image data received from the cameras or lidar sensors. The optical flow may indicate one or more characteristics of vehicle 406 that can be analyzed to ascertain a potential for an interaction from the one or more candidate lanes L1, L2, and L3. For example, based on the optical flow, computer system 112 may determine a predicted trajectory for vehicle 406, and determine a risk score for the one or more candidate lanes based on the predicted trajectory. Accordingly, computer system 112 may determine risk scores based on the optical flow. Additional, and/or alternative factors may be used to determine the risk scores. For example, a current or projected position of autonomous truck 402, a speed of autonomous truck 402, an acceleration of autonomous truck 402, a jerk (or rate of change of acceleration) of autonomous truck 402, a heading of autonomous truck 402, a type of autonomous truck 402, or a distance from autonomous truck 402 to merge region 404, may be used individually, or in combination. In some embodiments, the risk score for a path may be an aggregate of individual risk scores for the path. In some embodiments, the risk score for a path may be a weighted average of individual risk scores for the path.

In some embodiments, the probability of the change to the autonomous control strategy of the truck may be based on a comfort setting of the truck. For example, different trucks may have different comfort settings. A higher comfort setting may correspond to smaller operational limits. For example, comfort settings may be dynamically dependent on road and/or weather conditions. Accordingly, in slippery road conditions, a lower coefficient of friction may result in large changes to comfort settings. Accordingly, the probability of the change to the autonomous control strategy of autonomous truck 402 may be high.

In some embodiments, the probability of the change to the autonomous control strategy of the truck may be based on a level of swerving, braking, and/or acceleration needed to avoid the interaction with the vehicle. For example, with lower allowable braking limits, autonomous truck 402 may be constrained from braking hard. Accordingly, there may be a high probability of the change to the autonomous control strategy for autonomous truck 402. Similarly, a smaller allowable acceleration limit may result in a slower acceleration, thereby lowering a probability of the change to the autonomous control strategy for autonomous truck 402.

Additional, and/or alternative factors may impact the probability of the change to the autonomous control strategy, such as, for example, a probability of a collision between autonomous truck 402 and the vehicle 406, or a probability of an intersection of a trajectory of the vehicle 406 with a projected path of autonomous truck 402 on the one or more lanes.

In some embodiments, computer system 112 may control the autonomous truck 402 to execute a driving strategy based on the updated navigation plan. For example, computer system 112 may cause autonomous truck 402 to select option A, B, or C, based on the updated navigation plan. In some embodiments, the driving strategy may involve one or more of a turn strategy, a braking strategy, or an acceleration strategy. For example, the updated navigation plan may indicate that autonomous truck 402 continues to travel on initial lane L1. Accordingly, computer system 112 may execute a braking strategy, or an acceleration strategy to avoid an interaction with vehicle 406. As another example, the updated navigation plan may indicate that autonomous truck 402 executes a driving strategy involving a lane change from initial lane L1 to second lane L2. However, there may be another vehicle in second lane L2. Accordingly, computer system 112 may execute a braking strategy, or an acceleration strategy in combination with a turn (or lane change) strategy to avoid an interaction with the vehicle on second lane L2.

Although examples are described with autonomous truck 402 in initial lane L1, similar techniques would be applicable for a truck traveling on other lanes, such as, for example, second lane L2 or third lane L3. For example, when autonomous truck 402 is traveling in second lane L2, computer system 112 may control autonomous truck 402 to execute a driving strategy that prevents it from changing lanes from second lane L2 to initial lane L1. Generally, computations described herein may be performed regardless of a lane in which a vehicle travels.

In some embodiments, the driving strategy may be based on a disengage probability indicative of a likelihood that a change of a driving mode of the truck 402 from an autonomous mode to a manual mode. For example, computer system 112 may evaluate the disengage probability in executing a driving strategy. For example, road, traffic, road construction, accident, and/or weather conditions on a particular candidate lane may cause autonomous truck 402 to change a driving mode to manual mode. Generally, this may not be a desirable outcome, if there are alternate paths available to continue in autonomous mode. Accordingly, computer system 112 may execute the driving strategy to maintain a low disengage probability. For example, a change to a manual mode may be avoided if autonomous truck 402 is operated within certain operational parameters that maintain safety. Accordingly, computer system 112 may execute the driving strategy to operate autonomous truck 402 within the prescribed operational parameters, thereby avoiding a change to manual mode.

In some embodiments, the driving strategy may be based on one or more of a presence or absence of other vehicles in a vicinity of the truck, a number of available lanes on the road, road banking data for the road, road grade data for the road, road condition data for the road, weather condition data, data related to road construction, or presence of animate or inanimate objects. For example, presence of other vehicles in a vicinity of the truck may impact a risk score associated with the one or more lanes. However, even after a target lane is selected, computer system 112 may modulate a driving strategy to stay within safe driving parameters to avoid the other vehicles.

As another example, a number of available lanes may provide greater freedom of movement. For example, with three or more lanes, autonomous truck 402 may have more candidate lanes to select from, making it relatively easier to execute a lane change away from merge region 404. Similar considerations may be based on one or more factors such as road banking data for the road, road grade data for the road, road condition data for the road, weather condition data, data related to road construction, or presence of animate or inanimate objects. Such factors may impose respective limits on a truck's safe operational parameters, and computer system 112 may modify a driving strategy to stay within such safe driving parameters.

Figure 5:
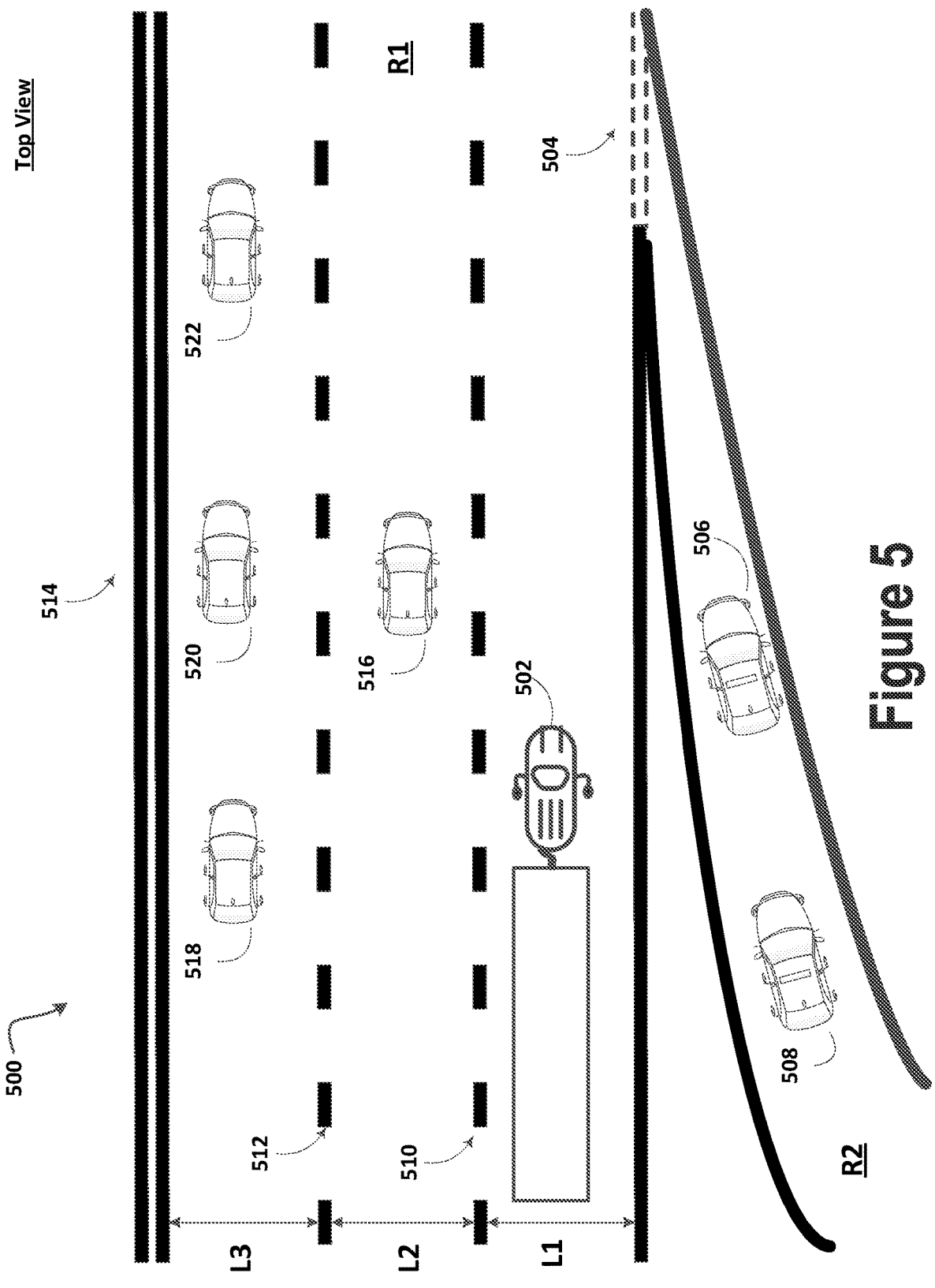
FIG. 5 is another schematic diagram of a merge region, according to an example embodiment.

FIG. 5 is another schematic diagram of a merge region 504, according to an example embodiment. A top view of a roadway 500 is illustrated. An autonomous truck 502 (e.g., truck 100) is shown as traveling on the road R1. As shown, the autonomous truck 502 may be a tractor-trailer that may be required to travel on the right hand lane L1 of a multi-lane highway, such as road R1. A merge region 504 is shown, where on-ramp R2 merges with road R1. Road R1 is shown to include multiple lanes, such as, for example, initial lane L1, second lane, L2, and third lane L3. As illustrated, the techniques described herein are not restricted to interactions between two vehicles only, but may apply to any collection of agents, such as, for example, multiple agents on one or more lanes of a highway, and one or more agents on a merging lane, or on multiple merging lanes.

As shown, on-ramp R2 has two vehicles, vehicle 506 and vehicle 508. Accordingly, the respective avoidance scores for initial lane L1 and on-ramp R2 may each be two (2). Accordingly, 2 units of cost may be added to each respective cost allocation.

Also, for example, second lane L2 has one vehicle 516, and third lane L3 has three vehicles 518, 520, and 522. Accordingly, a higher risk score may be allocated to third lane L3 than to second lane L2. Although based on the updated navigation plan, this scenario may indicate that second lane L2 may be selected for a lane change, computer system 112 may modulate a driving strategy to stay within safe driving parameters so as to avoid an interaction with vehicle 516 in second lane L2. Although FIGS. 4 and 5 illustrate merge region 404 and merge region 504 respectively, where a lane merges with a highway, the techniques described herein may be applied to any type of merge region.

Generally, a merge may be structured or unstructured. The term "structured merge region" may generally refer to a region where two or more lanes merge into one lane. Merge regions 404 and 504 are examples of structured merge regions. An "unstructured merge region" may generally refer to a region where a new lane enters a freeway. For example, a two lane freeway can become a three lane freeway with an entry lane that turns into a freeway lane. In some embodiments, the new third lane may be a right-most lane of the freeway. Accordingly, computer system 112 may modulate a driving strategy to lane change to the new third lane.

For example, trucks may be required to drive in the right-most lane of a freeway, and computer system 112 may modulate the driving strategy accordingly. Also, for example, a merge region may include a weave lane, where a single lane may be used by vehicles to enter a highway from one or more merging lanes, and by vehicles traveling on the highway to exit the highway. As another example, a merge region may include non-priority merge lanes where two or more lanes merge with no stops or give-aways for the lanes, and traffic generally merges on a first-come-first-go basis. Also, for example, a merge region may include priority merge lanes where a vehicle without a right of way may yield to a vehicle in a merging lane with a right of way. Although the description herein refers to structured merges, similar techniques are applicable to unstructured merges as well.

In some embodiments, the driving strategy may be based on analyzing autonomous lane change strategies of the truck and driving strategies of a human driver of another truck in substantially similar scenarios. For example, a variety of pertinent data may be logged, such as, for example, a trajectory of the human driver at or near a merge region, whether the human driver executed a driving strategy including a lane change away from the merge region, a contextual information of the scene, including but not limited to other drivers, vehicles, and/or agents at the scene, any stated "objectives," or "decisions," of the human driver, and a "belief" in the value of the interaction by a human driver or observer (e.g., a human may validate an interaction as a valuable interaction demonstrating appropriate behavioral responses, and such an interaction may be associated with a relatively higher weight). A simulation of an algorithm may be run using the same contextual information and objectives, and a similarity of the simulated algorithm's decisions, trajectories, and/or actions may be compared to choices made by the human driver. In some embodiments, a confidence score may be applied to the algorithm, where the confidence score indicates how well the algorithm is able to mimic decisions made by a human driver. For example, a high confidence score may be associated with the simulation when one or more decisions made by the simulation nearly align with decisions made by the human driver.

For example, comparison factors may include, a decision to change lanes away from a merge region, a timing and/or location of the decision, whether a turn signal was used, a timing of initiating the turn signal, whether a decision was made to return to an initial lane, a timing and/or location of such decision, and so forth. Upon comparison, a similarity score may be determined to indicate how close the match is. Accordingly, a high similarity score may indicate close similarities between decisions made by the algorithm, and decisions made by a human driver. Such a high similarity score may indicate a higher confidence level in decisions made by the algorithm. Also, for example, a low similarity score may indicate disparities between decisions made by the algorithm, and decisions made by a human driver. Such a low similarity score may indicate a lower confidence level in decisions made by the algorithm.

In some aspects, when the human driver's belief in a value of the interaction is low, a confidence level of the algorithm may be discounted.

Training Machine Learning Models for Generating Inferences/Predictions

In some embodiments, such statistical models may be applied to learn various initial configurations for the autonomous control strategy. For example, a trained machine learning model may be utilized to generate a recommendation whether to responsively execute an autonomous control strategy comprising one or more adjustments to an operation of the vehicle to avoid the interaction with the vehicle.

Figure 6:
FIG. 6 is a diagram illustrating a training phase and an inference phase of a trained machine learning model, in accordance with example embodiments.

FIG. 6 shows diagram 600 illustrating a training phase 602 and an inference phase 604 of trained machine learning model(s) 632, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 6 shows training phase 602 where one or more machine learning algorithms 620 are being trained on training data 610 to become trained machine learning model 632. Then, during inference phase 604, trained machine learning model 632 can receive input data 630 and one or more inference/prediction requests 640 (perhaps as part of input data 630) and responsively provide as an output one or more inferences and/or predictions 650.

As such, trained machine learning model(s) 632 can include one or more models of one or more machine learning algorithms 620. Machine learning algorithm(s) 620 may include, but are not limited to: an artificial neural network (e.g., a convolutional neural network, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 620 may be supervised or unsupervised, and may implement any suitable combination of online and offline learning.

In some examples, machine learning algorithm(s) 620 and/or trained machine learning model(s) 632 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 620 and/or trained machine learning model(s) 632. In some examples, trained machine learning model(s) 632 can be trained, reside on and executed to provide inferences on a particular computing device, and/or otherwise can make inferences for the particular computing device.

During training phase 602, machine learning algorithm(s) 620 can be trained by providing at least training data 610 as training input using unsupervised, semi-supervised, supervised, and/or reinforcement learning techniques. Unsupervised learning involves providing a portion (or all) of training data 610 to machine learning algorithm(s) 620 and machine learning algorithm(s) 620 determining one or more output inferences based on the provided portion (or all) of training data 610. In some embodiments, training of the machine learning model may involve unsupervised learning based on a loss function that measures travel time, or a disengage probability, or both. Semi-supervised learning involves having correct results for part, but not all, of training data 610. During semi-supervised learning, supervised learning is used for a portion of training data 610 having correct results, and unsupervised learning is used for a portion of training data 610 not having correct results.

Supervised learning involves providing a portion of training data 610 to machine learning algorithm(s) 620, with machine learning algorithm(s) 620 determining one or more output inferences based on the provided portion of training data 610, and the output inference(s) are either accepted or corrected based on correct results associated with training data 610. In some examples, supervised learning of machine learning algorithm(s) 620 can be governed by a set of rules and/or a set of labels for the training input, and the set of rules and/or set of labels may be used to correct inferences of machine learning algorithm(s) 620.

For example, models developed through supervised learning can be used to help an autonomous vehicle make decisions in situations where it may need to lane change away from a merge region. For example, logged data from executed manual driving strategies, autonomous driving strategies, or both, near freeway merge regions may be utilized for supervised training of machine learning algorithm(s) 620. For example, data labelers may observe the scene, nearby traffic, and a pose of the autonomous vehicle. Data labelers may then label the situation as either "yes" to indicate execution of a lane change strategy away from merge region, or as "no" to indicate execution of no lane change strategy. The labeled scenes can then be used as training data 610 to train machine learning algorithm(s) 620 that would help the autonomous truck make decisions in novel driving scenarios.

Supervised learning methods may be similarly applied to simulated data to significantly augment the training data 610. Artificial freeway merge scenarios may be generated with various geometries, random traffic placements, random agent velocities, and random agent accelerations. For example, with a simulated driving in a right lane while approaching a freeway merge region, the data labeler can label the situation as either "yes" to indicate execution of a lane change strategy away from merge region, or as "no" to indicate execution of no lane change strategy. The labeled artificial scenes can be used as training data 610 to train machine learning algorithm(s) 620.

Reinforcement learning involves machine learning algorithm(s) 620 receiving a reward signal regarding a prior inference, where the reward signal can be a numerical value. During reinforcement learning, machine learning algorithm(s) 620 can output an inference and receive a reward signal in response, where machine learning algorithm(s) 620 are configured to try to maximize the numerical value of the reward signal. In some examples, reinforcement learning also utilizes a value function that provides a numerical value representing an expected total of the numerical values provided by the reward signal over time. For example, when a discrete decision is to be selected from two or more options or plans, such as, for example, continue to drive in a first lane or change lanes to a second lane, a policy may be constructed that scores each planned trajectory against a rubric of features.

For example, scored features of a trajectory may include (but may not be limited to) a progress made with each trajectory, a difficulty of performing a lane change operation, an amount of acceleration needed by either the autonomous truck or other agents and/or vehicles in the scene in order to smoothly negotiate the merge region, a kinematic comfort of each trajectory, or a minimum predicted buffer provided to other agents and/or vehicles at the scene. The total score for each possible trajectory may be a weighted sum of each scored feature, and the autonomous truck may follow a plan with a lowest score. The respective feature weights may be selected by a variety of automatic and/or heuristic methods. For example, feature weights may be learned from a human driving behavior at or near merge regions. Also, for example, for a set of trajectories driven by a human driver at or near merge regions, a technique such as inverse reinforcement learning may be applied to compute the set of feature weights. Such an approach helps mimic a logic applied by a human driver.

In some examples, machine learning algorithm(s) 620 and/or trained machine learning model(s) 632 can be trained using other machine learning techniques, including but not limited to, incremental learning and curriculum learning.

In some examples, machine learning algorithm(s) 620 and/or trained machine learning model(s) 632 can use transfer learning techniques. For example, transfer learning techniques can involve trained machine learning model(s) 632 being pre-trained on one set of data and additionally trained using training data 610. More particularly, machine learning algorithm(s) 620 can be pre-trained on data from one or more computing devices and a resulting trained machine learning model provided to a particular computing device, where the particular computing device is intended to execute the trained machine learning model during inference phase 604. Then, during training phase 602, the pre-trained machine learning model can be additionally trained using training data 610, where training data 610 can be derived from kernel and non-kernel data of the particular computing device. This further training of the machine learning algorithm(s) 620 and/or the pre-trained machine learning model using training data 610 of the particular computing device's data can be performed using either supervised or unsupervised learning. Once machine learning algorithm(s) 620 and/or the pre-trained machine learning model has been trained on at least training data 610, training phase 602 can be completed. The trained resulting machine learning model can be utilized as at least one of trained machine learning model(s) 632.

In particular, once training phase 602 has been completed, trained machine learning model(s) 632 can be provided to a computing device, if not already on the computing device. Inference phase 604 can begin after trained machine learning model(s) 632 are provided to the particular computing device.

During inference phase 604, trained machine learning model(s) 632 can receive input data 630 and generate and output one or more corresponding inferences and/or predictions 650 about input data 630. As such, input data 630 can be used as an input to trained machine learning model(s) 632 for providing corresponding inference(s) and/or prediction(s) 650 to kernel components and non-kernel components. For example, trained machine learning model(s) 632 can generate inference(s) and/or prediction(s) 650 in response to one or more inference/prediction requests 640. In some examples, trained machine learning model(s) 632 can be executed by a portion of other software. For example, trained machine learning model(s) 632 can be executed by an inference or prediction daemon to be readily available to provide inferences and/or predictions upon request. Input data 630 can include data from the particular computing device executing trained machine learning model(s) 632 and/or input data from one or more computing devices other than the particular computing device.

Input data 630 can include one or more of real-world driving scenarios, simulated driving scenarios, or both. Artificial freeway merge scenarios may be generated with various geometries, random traffic placements, random agent velocities, and/or random agent accelerations. Other types of input data are possible as well. Input data 630 can be labeled images that indicate a preference for a lane change or not, or that select a driving strategy from one or more available strategies.

Inference(s) and/or prediction(s) 650 can include output navigation plans, output driving strategies, and/or other output data produced by trained machine learning model(s) 632 operating on input data 630 (and training data 610). In some embodiments, output inference(s) and/or prediction(s) 650 may include predicted navigation plans of other vehicles (such as a vehicle that has a high probability of an interaction with the autonomous truck, a vehicle to the autonomous truck, a merging vehicle, and so forth). In some examples, trained machine learning model(s) 632 can use output inference(s) and/or prediction(s) 650 as input feedback 660. Trained machine learning model(s) 632 can also rely on past inferences as inputs for generating new inferences.

Deep neural nets for determining lane change strategies can be examples of machine learning algorithm(s) 620. After training, the trained version of deep neural nets can be examples of trained machine learning model(s) 632. In this approach, an example of inference/prediction request(s) 640 can be a request to predict a driving strategy for an input merge region and a corresponding example of inferences and/or prediction(s) 650 can be an output driving strategy.

For example, encoding a roadgraph may be of high significance for various tasks in perception and/or behavior predictions such as lane change, and/or merge predictions. In some embodiments, a roadgraph may be leveraged in deep learning by rasterizing roadgraph features onto a two-dimensional (2D) top-down grid (i.e. rendered images), and then by applying a convolution neural network (CNN) on the rendered images. Such a rasterized approach may depend on various factors, such as, for example, a geometry range, a CNN receptive field (that may impose limits on a long-range understanding of geometry), and precision thresholds from the rendering.

In some embodiments, a hierarchical graph neural network (e.g., VectorNet) may be used to encode the roadgraph and/or driving behavior dynamics, without rendering. The VectorNet model may be trained in a supervised manner, as described above, or may be trained to minimize an appropriate loss function to determine lane change strategies.

In some aspects, a VectorNet model may be a unified representation for multi-agent dynamics and structured scene context, and may be generated directly from respective vectorized representation. For example, a geographic extent of road features may be represented in geographic coordinates as a point, a polygon, and/or a curve. For example, a lane boundary may include a plurality of control points that can generate a spline. As another example, a crosswalk may be represented as a polygon defined by several points. Also, for example, a stop sign may be represented by a single point. Such entities may be approximated as geographic polylines defined by multiple control points, along with their respective attributes. Similarly, dynamics of moving agents (e.g., vehicles, pedestrians) may also be approximated by dynamic polylines based on their respective motion trajectories. The geographic and dynamic polylines may then be represented as collections of vectors.

In some embodiments, graph neural networks (GNNs) may be utilized to incorporate the collections of vectors. For example, a node in the GNN may represent a vector, and node features may be determined based on a start location and an end location of each vector, along with other attributes, such as a polyline group identifier, semantic labels, and so forth. Also, for example, context information from maps, along with the trajectories of other moving agents may be propagated to a target agent node through the GNN. Accordingly, an output node feature corresponding to the target agent may be utilized to decode future trajectories for the target agent.

One or more connectivities of the GNN may be constrained based on a spatial and/or semantic proximity of the nodes. Accordingly, a hierarchical graph architecture may be generated, where vectors belonging to the same polylines with the same semantic labels are connected and embedded into polyline features, and all polylines may then be fully connected with each other to exchange information. In some embodiments, local graphs may be implemented with multi-layer perceptrons, and the global graphs may be implemented with self-attention.

In some embodiments, the image rendering approach may be combined with the VectorNet approach to train machine learning algorithm(s) 620.

In some examples, a first computing device can include the trained version of the machine learning model, perhaps after training the machine learning model. Then, the first computing device can receive requests to predict lane change strategies, and use the trained version of the machine learning model to predict the lane change strategy.

In some examples, two or more computing devices, such as a client device and a server device can be used to provide the output; e.g., the client device can generate and send requests to predict lane change strategies to the server device. Then, the server device can use the trained version of the machine learning model to predict the lane change strategies. Then, upon reception of responses to the requests, the client device can provide the requested output via one or more control interfaces.

Additional Example Operations

FIG. 7 illustrates a flow chart 700, in accordance with example embodiments. The operations may be carried out by processor 113 of truck 100, the components thereof, and/or the circuitry associated therewith, among other possibilities. However, the operations can also be carried out by other types of devices or device subsystems. For example, the process could be carried out by a server device, an autonomous vehicle, and/or a robotic device.

The embodiments of FIG. 7 may be simplified by the removal of any one or more of the features shown therein. Further, these embodiments may be combined with features, aspects, and/or implementations of any of the previous figures or otherwise described herein.

Block 710 may involve determining, by a computing device and based on map data, an approaching merge region comprising an on-ramp merging with a road. The road may include one or more lanes. A truck may be traveling on an initial lane of the one or more lanes according to a navigation plan.

Block 720 may involve receiving, by the computing device, an indication of movement of a vehicle on the on-ramp. The indication of movement may be based on data collected by one or more sensors configured to capture sensor data from an environment surrounding the truck.

Block 730 may involve determining, by the computing device and for the on-ramp and the one or more lanes, respective avoidance scores indicative of a likelihood of an interaction between the truck and the vehicle based on the approaching merge region.

Block 740 may involve updating, by the computing device, the navigation plan based on the respective avoidance scores.

Block 750 may involve controlling, by the computing device, the truck to execute a driving strategy based on the updated navigation plan.

In some embodiments, the merge region may be within a threshold distance of the truck.

In some embodiments, the road may be a highway and the initial lane may be a right lane of the highway.

In some embodiments, the respective avoidance scores may be based on a count of a number of vehicles on the merging lane.

In some embodiments, the navigation plan may be based on a cost allocation associated with the one or more lanes, and the updating of the navigation plan may involve updating the cost allocation based on the respective avoidance scores.

In such embodiments, the updating of the navigation plan may further involve identifying, in response to the approaching merge region and the indication of movement of the vehicle, one or more candidate lanes of the one or more lanes, wherein the truck can navigate from the initial lane to the one or more candidate lanes. Such embodiments may additionally involve selecting a target lane of the one or more candidate lanes, wherein the target lane corresponds to a low updated cost allocation.

In such embodiments, the updating of the navigation plan may also involve determining, for each of the one or more lanes, a risk score associated with the merge region, wherein the risk score is indicative of a probability of a change to an autonomous control strategy of the truck if the truck were to travel on the one or more lanes, and wherein the updating of the cost allocation is based on the risk score.

In some embodiments, the risk score may be based on one or more of: (i) geometric properties of the vehicle, (ii) a position of the vehicle within an environment of the truck, (iii) a speed of the vehicle, (iv) an optical flow associated with the vehicle, (v) a current or projected position of the truck, (vi) a speed of the truck, (vii) an acceleration of the truck, (viii) a jerk of the truck, (ix) a heading of the truck, (x) a type of truck, or (xi) a distance from the truck to the merge region.

In some embodiments, the probability of the change to the autonomous control strategy of the vehicle is based on one or more of: (i) a comfort setting of the truck, (ii) a level of swerving, braking, and/or acceleration needed to avoid the interaction, (iii) a probability of a collision between the truck and the vehicle, or (iv) a probability of an intersection of a trajectory of the vehicle with a projected path of the truck on the one or more candidate lanes.

In some embodiments, the driving strategy may include one or more of a turn strategy, a braking strategy, or an acceleration strategy.

In some embodiments, the driving strategy may be further based on a disengage probability indicative of a likelihood that a change of a driving mode of the truck from an autonomous mode to a manual mode.

In some embodiments, the driving strategy may be further based on one or more of a presence of other vehicles in a vicinity of the truck, a number of lanes on the road, road banking data for the road, road grade data for the road, road condition data for the road, weather condition data, data related to road construction, or presence of animate or inanimate objects.

Some embodiments may involve receiving, from a trained machine learning model, a recommendation whether to responsively execute an autonomous control strategy comprising one or more adjustments to an operation of the truck to avoid the interaction with the vehicle.

Some embodiments may involve training a machine learning model to generate a recommendation whether to responsively execute an autonomous control strategy comprising one or more adjustments to the operation of the truck to avoid the interaction with the vehicle. In some embodiments, the training of the machine learning model may involve supervised learning based on a labeled training dataset comprising one or more of real-world scenarios, simulated scenarios, or both. In some embodiments, the training of the machine learning model may involve unsupervised learning based on a loss function that measures travel time, or a disengage probability, or both. In some embodiments, the machine learning model may be an inverse reinforcement model, and the training of the machine learning model may involve learning a set of feature weights to nearly replicate a driving strategy of a human driver of the truck.

In some embodiments, the driving strategy may be further based on analyzing autonomous lane change strategies of the truck and driving strategies of a human driver of another truck in substantially similar scenarios.

Example Computer Readable Media

Figure 8:
FIG. 8 depicts an example computer readable medium, in accordance with example embodiments.

FIG. 8 depicts an example computer readable medium, in accordance with example embodiments. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., described in flow chart 700) may be implemented by computer program instructions encoded on a computer readable storage media in a machine-readable format, or on other media or articles of manufacture (e.g., instructions 115 of truck 100, instructions 412 of the computing device 404, etc.). FIG. 8 is a schematic illustrating a conceptual partial view of an example computer program product that includes a computer program for executing a computer process on a computing device, such as on a radar planning system, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-6. In some examples, the signal bearing medium 802 may be a computer-readable medium 806, such as, but not limited to, a hard disk drive, a Compact Disc (CD), a Digital Video Disk (DVD), a digital tape, memory, etc. In some implementations, the signal bearing medium 802 may be a computer recordable medium 808, such as, but not limited to, memory, read/write (R/W) CDs, R/W DVDs, etc. In some implementations, the signal bearing medium 802 may be a communication medium 810 (e.g., a fiber optic cable, a waveguide, a wired communications link, etc.). Thus, for example, the signal bearing medium 802 may be conveyed by a wireless form of the communications medium 810.

The one or more programming instructions 804 may be, for example, computer executable and/or logic implemented instructions. In some examples, a computing device may be configured to provide various operations, functions, or actions in response to the programming instructions 804 conveyed to the computing device by one or more of the computer readable medium 806, the computer recordable medium 808, and/or the communications medium 810.

The computer readable medium 806 may also be distributed among multiple data storage elements, which could be remote from each other. The computing device that executes some or all of the stored instructions could be an external computer, or a mobile computing platform, such as a smartphone, tablet device, personal computer, wearable device, etc. Alternatively, the computing device that executes some or all of the stored instructions could be a remote computer system, such as a server, or a distributed cloud computing network.

<div align="center">CONCLUSION</div>

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for the purpose of illustration and are not intended to be limiting, with the true scope being indicated by the following claims.

What is claimed is:

1. A computer-implemented method, comprising:
determining, by a computing device and based on map data, an approaching merge region comprising an on-ramp merging with a road, wherein the road comprises a plurality of lanes, wherein an autonomous vehicle is traveling on an initial lane of the plurality of lanes and can navigate from the initial lane to one or more candidate lanes of the plurality of lanes, and wherein the initial lane and the one or more candidate lanes are associated with respective cost allocations;

receiving, by the computing device, an indication of movement of at least one other vehicle on the on-ramp, wherein the indication of movement is based on data collected by one or more sensors configured to capture sensor data from an environment surrounding the autonomous vehicle;

determining, by the computing device and for each of the initial lane and the one or more candidate lanes, respective avoidance scores indicative of a likelihood of an interaction between the autonomous vehicle and the at least one other vehicle based on the approaching merge region;

updating, by the computing device, respective cost allocations for each of the initial lane and the one or more candidate lanes based on the respective avoidance scores; and controlling, by the computing device, the autonomous vehicle to execute a driving strategy based on the updated cost allocations associated with the initial lane and the one or more candidate lanes.

2. The method of claim 1, wherein the merge region is within a threshold distance of the autonomous vehicle.

3. The method of claim 1, wherein the road is a highway, and wherein the initial lane is a right lane of the highway.

4. The method of claim 1, wherein the respective avoidance scores are based on a count of a number of vehicles on the on-ramp.

5. The method of claim 1, further comprising:

selecting a target lane of the one or more candidate lanes based on the target lane having a lower updated cost allocation than the initial lane.

6. The method of claim 5, wherein controlling, by the computing device, the autonomous vehicle to execute a driving strategy based on the updated cost allocations associated with the initial lane and the one or more candidate lanes comprises:

controlling, by the computing device, the autonomous vehicle to change lanes from the initial lane to the target lane.

7. The method of claim 1, wherein updating the respective cost allocations for each of the initial lane and the one or more candidate lanes further comprises:

determining, for each of the initial lane and the one or more candidate lanes, a risk score associated with the merge region, wherein the risk score is indicative of a probability of a change to an autonomous control strategy of the autonomous vehicle.

8. The method of claim 7, wherein the risk score is based on one or more of: (i) geometric properties of the at least one other vehicle, (ii) a position of the at least one other vehicle within an environment of the autonomous vehicle, (iii) a speed of the at least one other vehicle, (iv) an optical flow associated with the at least one other vehicle, (v) a current or projected position of the autonomous vehicle, (vi) a speed of the autonomous vehicle, (vii) an acceleration of the autonomous vehicle, (viii) a jerk of the autonomous vehicle, (ix) a heading of the autonomous vehicle, (x) a type of the autonomous vehicle, or (xi) a distance from the autonomous vehicle to the merge region.

9. The method of claim 7, wherein the probability of the change to the autonomous control strategy of the autonomous vehicle is based on one or more of: (i) a comfort setting of the autonomous vehicle, (ii) a level of swerving, braking, and/or acceleration needed to avoid the interaction, (iii) a probability of a collision between the autonomous vehicle and the at least one other vehicle, or (iv) a probability of an intersection of a trajectory of the at least one other vehicle with a projected path of the autonomous vehicle.

10. The method of claim 1, wherein the driving strategy comprises one or more of a turn strategy, a braking strategy, or an acceleration strategy.

11. The method of claim 1, wherein the driving strategy is further based on a disengage probability indicative of a likelihood that a change of a driving mode of the autonomous vehicle from an autonomous mode to a manual mode.

12. The method of claim 1, wherein the driving strategy is further based on one or more of a presence of other vehicles in a vicinity of the autonomous vehicle, a number of lanes on the road, road banking data for the road, road grade data for the road, road condition data for the road, weather condition data, data related to road construction, or presence of animate or inanimate objects.

13. The method of claim 1, further comprising:

receiving, from a trained machine learning model, a recommendation whether to responsively execute an autonomous control strategy comprising one or more adjustments to an operation of the autonomous vehicle to avoid the interaction with the at least one other vehicle.

14. The method of claim 1, further comprising:

training a machine learning model to generate a recommendation whether to responsively execute an autonomous control strategy comprising one or more adjustments to the operation of the autonomous vehicle to avoid the interaction with the at least one other vehicle.

15. The method of claim 14, wherein the training of the machine learning model comprises supervised learning based on a labeled training dataset comprising one or more of real-world scenarios, simulated scenarios, or both.

16. The method of claim 14, wherein the training of the machine learning model comprises unsupervised learning based on a loss function that measures travel time, or a disengage probability, or both.

17. The method of claim 14, wherein the machine learning model is an inverse reinforcement model, and wherein the training of the machine learning model comprises learning a set of feature weights from human driving behavior.

18. The method of claim 1, wherein the driving strategy is further based on analyzing driving strategies of a human driver.

19. An autonomous vehicle, comprising:

one or more sensors configured to capture sensor data from an environment surrounding the autonomous vehicle; and a controller configured to perform operations comprising:

determining, based on map data, an approaching merge region comprising an on-ramp merging with a road, wherein the road comprises a plurality of lanes, wherein the autonomous vehicle is traveling on an initial lane of the plurality of lanes and can navigate from the initial lane to one or more candidate lanes of the plurality of lanes, and wherein the initial lane and the one or more candidate lanes are associated with respective cost allocations;

receiving an indication of movement of at least one other vehicle on the on-ramp, wherein the indication of movement is based on data collected by one or more sensors configured to capture sensor data from an environment surrounding the autonomous vehicle;

determining, for the initial land and the one or more candidate lanes, respective avoidance scores indicative of a likelihood of an interaction between the autonomous vehicle and the at least one other vehicle based on the approaching merge region;

updating respective cost allocations for each of the initial lane and the one or more candidate lanes based on the respective avoidance scores; and controlling the autonomous vehicle to execute a driving strategy based on the updated cost allocations associated with the initial lane and the one or more candidate lanes.

20. A system, comprising:

at least one processor; and a memory having stored thereon instructions that, upon execution by the at least one processor, cause the system to perform operations comprising:

determining, based on map data, an approaching merge region comprising an on-ramp merging with a road, wherein the road comprises a plurality of lanes, wherein an autonomous vehicle is traveling on an initial lane of the plurality of lanes and can navigate from the initial lane to one or more candidate lanes of the plurality of lanes, and wherein the initial lane and the one or more candidate lanes are associated with respective cost allocations;

receiving an indication of movement of at least one other vehicle on the on-ramp, wherein the indication of movement is based on data collected by one or more sensors configured to capture sensor data from an environment surrounding the autonomous vehicle;

determining, for the initial lane and the one or more candidate lanes, respective avoidance scores indicative of a likelihood of an interaction between the autonomous vehicle and the at least one other vehicle based on the approaching merge region;

updating respective cost allocations for each of the initial lane and the one or more candidate lanes based on the respective avoidance scores; and controlling the autonomous vehicle to execute a driving strategy based on the updated cost allocations associated with the initial lane and the one or more candidate lanes.

* * * * *